US009550636B2

(12) United States Patent
Maguire

(10) Patent No.: US 9,550,636 B2
(45) Date of Patent: *Jan. 24, 2017

(54) METHOD AND APPARATUS FOR RESIN DELIVERY WITH ADJUSTABLE AIR FLOW LIMITER

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/602,784

(22) Filed: Jan. 22, 2015

(65) Prior Publication Data
US 2015/0232290 A1  Aug. 20, 2015

Related U.S. Application Data

(63) Continuation-in-part of application No. 14/185,016, filed on Feb. 20, 2014, and a continuation-in-part of application No. 14/574,561, filed on Dec. 18, 2014, and a continuation-in-part of application No. 14/593,010, filed on Jan. 9, 2015.

(60) Provisional application No. 62/027,379, filed on Jul. 22, 2014.

(51) Int. Cl.
*B65G 53/66* (2006.01)
*B65G 53/58* (2006.01)
*G05D 7/01* (2006.01)

(52) U.S. Cl.
CPC ............... *B65G 53/66* (2013.01); *B65G 53/58* (2013.01); *G05D 7/0153* (2013.01); *Y10T 137/0318* (2015.04); *Y10T 137/8242* (2015.04)

(58) Field of Classification Search
CPC ............... G05D 7/0146; G05D 7/0153; Y10T 137/7835; Y10T 137/7784; Y10T 137/7785; Y10T 137/7792; Y10T 137/8242; Y10T 137/0318; B65G 53/26; B65G 53/50; B65G 53/58; B65G 53/66
USPC ....... 251/42, 60, 129.22, 285; 137/509, 497, 137/498, 504, 554
See application file for complete search history.

(56) References Cited

U.S. PATENT DOCUMENTS 1,001,510 A    8/1911  Curbey
1,418,096 A    5/1922  Royer
(Continued)

FOREIGN PATENT DOCUMENTS

CN    202302166 U    7/2012
DE    3541532 A1     5/1986
(Continued)

OTHER PUBLICATIONS

Sheet of 2 photographs of Mould-Tek gravimetric blender, circa 1993.
(Continued)

*Primary Examiner* — William McCalister
(74) *Attorney, Agent, or Firm* — Fox Rothschild LLP

(57) ABSTRACT

Method and apparatus for air flow limiting comprise a vertically oriented tube, a sail assembly positioned in the tube and moveable therewithin responsively to air flow through the tube to limit rate of air flow through the tube and halt air flow through the tube upon air flow rate through the tube exceeding a preselected value, and a moveable stop for adjustably changing the length of travel of the sail assembly thereby changing the maximum amount of air flow.

8 Claims, 10 Drawing Sheets

(56) References Cited

U.S. PATENT DOCUMENTS

| | | | | |
|---|---|---|---|---|
| 1,579,251 | A * | 4/1926 | Schossow | G05D 7/0146 137/504 |
| 2,116,912 | A | 5/1938 | Richardson | |
| 2,161,190 | A | 6/1939 | Paull | |
| 2,351,035 | A | 6/1944 | Grant, Jr. | |
| 2,403,689 | A * | 7/1946 | Sprague | F16K 17/30 137/498 |
| 2,601,654 | A * | 6/1952 | Wright | E21B 34/02 137/498 |
| 2,655,934 | A | 10/1953 | Charles | |
| 2,765,812 | A | 10/1956 | Werner | |
| 2,917,077 | A * | 12/1959 | Ziege | F16K 47/023 137/514.7 |
| 3,111,115 | A | 11/1963 | Best | |
| 3,115,276 | A | 12/1963 | Johanningmeier | |
| 3,122,162 | A | 2/1964 | Sands | |
| 3,151,628 | A * | 10/1964 | Heckert | G05D 7/0106 137/495 |
| 3,164,141 | A | 1/1965 | Jones | |
| 3,209,898 | A | 10/1965 | Beebe et al. | |
| 3,348,848 | A | 10/1967 | Lucking et al. | |
| 3,367,362 | A | 2/1968 | Hoffman | |
| 3,381,708 | A * | 5/1968 | Chenoweth | E21B 34/08 137/504 |
| 3,434,493 | A * | 3/1969 | Owens | B60T 11/32 137/460 |
| 3,468,338 | A | 9/1969 | Patterson | |
| 3,470,994 | A | 10/1969 | Schnell et al. | |
| 3,621,873 | A * | 11/1971 | Kenann | F16K 17/28 137/460 |
| 3,735,777 | A | 5/1973 | Katzer et al. | |
| 3,794,077 | A | 2/1974 | Fanshier | |
| 3,872,884 | A * | 3/1975 | Busdiecker | F16K 17/30 137/498 |
| 3,959,636 | A | 5/1976 | Johnson et al. | |
| 3,985,262 | A | 10/1976 | Nauta | |
| 4,026,442 | A | 5/1977 | Orton | |
| 4,108,334 | A | 8/1978 | Moller | |
| 4,148,100 | A | 4/1979 | Moller | |
| 4,174,731 | A * | 11/1979 | Sturgis | F16K 17/26 137/498 |
| 4,183,467 | A * | 1/1980 | Sheraton | F02M 61/205 137/509 |
| 4,219,136 | A | 8/1980 | Williams et al. | |
| 4,269,223 | A | 5/1981 | Carter et al. | |
| 4,284,261 | A * | 8/1981 | Benjamin | F02M 1/14 137/907 |
| 4,294,020 | A | 10/1981 | Evans | |
| 4,342,443 | A * | 8/1982 | Wakeman | F02M 51/0617 123/472 |
| 4,354,622 | A | 10/1982 | Wood | |
| 4,402,436 | A | 9/1983 | Hellgren | |
| 4,402,635 | A | 9/1983 | Maruo | |
| 4,454,943 | A | 6/1984 | Moller | |
| 4,475,672 | A | 10/1984 | Whitehead | |
| 4,498,783 | A | 2/1985 | Rudolph | |
| 4,501,518 | A | 2/1985 | Smith | |
| 4,508,091 | A * | 4/1985 | Wakeman | F02M 51/0617 123/458 |
| 4,525,071 | A | 6/1985 | Horowitz et al. | |
| 4,581,704 | A | 4/1986 | Mitsukawa | |
| 4,705,083 | A | 11/1987 | Rossetti | |
| 4,756,348 | A | 7/1988 | Moller | |
| 4,793,711 | A | 12/1988 | Ohlson | |
| 4,830,508 | A | 5/1989 | Higuchi et al. | |
| 4,842,198 | A | 6/1989 | Chang | |
| 4,848,534 | A | 7/1989 | Sandwall | |
| 4,850,703 | A | 7/1989 | Hanaoka et al. | |
| 4,962,831 | A * | 10/1990 | Dundas | A62C 2/04 137/498 |
| 4,995,422 | A * | 2/1991 | Chew | G05D 7/0146 137/504 |
| 5,011,043 | A * | 4/1991 | Whigham | B67D 1/0037 222/129.3 |
| 5,110,521 | A | 5/1992 | Moller | |
| 5,116,547 | A | 5/1992 | Tsukahara et al. | |
| 5,132,897 | A | 7/1992 | Allenberg | |
| 5,143,166 | A | 9/1992 | Hough | |
| 5,148,943 | A | 9/1992 | Moller | |
| 5,172,489 | A | 12/1992 | Moller | |
| 5,225,210 | A | 7/1993 | Shimoda | |
| 5,244,179 | A * | 9/1993 | Wilson | E03D 5/10 251/285 |
| 5,252,008 | A | 10/1993 | May, III et al. | |
| 5,261,743 | A | 11/1993 | Moller | |
| 5,285,930 | A | 2/1994 | Nielsen | |
| 5,340,949 | A | 8/1994 | Fujimura et al. | |
| 5,341,961 | A | 8/1994 | Hausam | |
| 5,423,455 | A | 6/1995 | Ricciardi et al. | |
| 5,575,309 | A * | 11/1996 | Connell | F16K 31/082 137/554 |
| 5,613,516 | A * | 3/1997 | Landrum | G05D 16/10 137/509 |
| 5,651,401 | A | 7/1997 | Cados | |
| 5,704,391 | A * | 1/1998 | McGowan, Jr. | F16K 17/12 137/454.2 |
| 5,767,453 | A | 6/1998 | Wakou et al. | |
| 5,767,455 | A | 6/1998 | Mosher | |
| 5,780,779 | A | 7/1998 | Kitamura et al. | |
| 5,791,830 | A | 8/1998 | Fort | |
| 5,843,513 | A | 12/1998 | Wilke et al. | |
| 6,007,236 | A | 12/1999 | Maguire | |
| 6,076,803 | A * | 6/2000 | Johnson | F16K 31/0655 251/129.22 |
| 6,089,794 | A | 7/2000 | Maguire | |
| 6,152,656 | A | 11/2000 | Curtis et al. | |
| 6,158,363 | A | 12/2000 | Memory et al. | |
| 6,199,583 | B1 | 3/2001 | Iacovella | |
| 6,379,086 | B1 | 4/2002 | Goth | |
| 6,413,020 | B1 | 7/2002 | Davison | |
| 6,585,004 | B1 * | 7/2003 | Porter | F15B 11/123 137/625.64 |
| 6,634,375 | B2 * | 10/2003 | Olivas | F16K 17/30 137/458 |
| 6,644,345 | B2 * | 11/2003 | Dulin | F16K 17/30 137/462 |
| 7,066,689 | B2 | 6/2006 | Maguire | |
| 7,117,886 | B2 * | 10/2006 | Kajitani | G05D 16/202 137/487.5 |
| 7,766,037 | B2 * | 8/2010 | Moenkhaus | F16K 31/0655 137/556.3 |
| 8,070,844 | B2 | 12/2011 | Maguire | |
| 8,092,070 | B2 | 1/2012 | Maguire | |
| 8,408,228 | B1 * | 4/2013 | Jimenez | F16K 43/006 137/498 |
| 8,753,432 | B2 | 6/2014 | Maguire | |
| 2002/0061232 | A1 | 5/2002 | Zlotos | |
| 2004/0115013 | A1 | 6/2004 | Goth | |
| 2004/0221893 | A1 * | 11/2004 | Johnson | F16K 17/34 137/498 |
| 2005/0039816 | A1 | 2/2005 | Maguire | |
| 2009/0151800 | A1 * | 6/2009 | Salmento | F03B 11/00 137/561 R |
| 2011/0299943 | A1 | 12/2011 | Woolever | |
| 2015/0232287 | A1 | 8/2015 | Maguire | |
| 2015/0232289 | A1 | 8/2015 | Maguire | |
| 2015/0321860 | A1 | 11/2015 | Maguire | |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |

(56) References Cited

FOREIGN PATENT DOCUMENTS

| | | |
|---|---|---|
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, DE demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender the Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Four page two-sided color brochure entitled "Novatec Inc. Vacuum Loaders—Electro-Polished Stainless Steel Finish" of Novatec Inc., undated.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries as Primary", AEC, Inc., 1999.
AEC Whitlock Operation and Installation Manual for VacTrac™ Series Conveying Systems, Single-Station Controllers, Oct. 30, 1997.
Whitlock Turbo-Vac™ Vacuum Power Units Installation,k Operation and Maintenance Manual, 1984.
AEC Whitlock Operation & Installation Manual—Continuous Vacuum/Pressure Conveying Systems, Single- and Dual-Blower Systems, Apr. 28, 1998.
AEC Whitlock Operation and Installation Manual WD Series WD350 to WD3000 Dehumidifying Dryers with Fuzzy Logic Controls, Oct. 11, 1995.
AEC Whitlock Operation and Installation Manual Nomad Series PD-2 to PD-4 Drying and Conveying Systems, Apr. 11, 1997.
AEC Whitlock HE—CHE—BCHE Mass Flow Series Dying Hoppers, Dec. 17, 1997.
Written Opinion for PCT Application No. PCT/US2016/12411, dated Mar. 2, 2016.
International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.

\* cited by examiner

METHOD AND APPARATUS FOR RESIN DELIVERY WITH ADJUSTABLE AIR FLOW LIMITER

CROSS-REFERENCE TO RELATED PATENT APPLICATIONS

This patent application is a 35 USC 120 continuation-in-part of U.S. Ser. No. 14/185,016 entitled "Air Flow Regulator" filed 20 Feb. 2014 in the name of Stephen B. Maguire, and is also a 35 USC 120 continuation-in-part of U.S. Ser. No. 14/574,561 entitled "Resin Delivery System with Air Flow Regulator" filed 18 Dec. 2014 in the name of Stephen B. Maguire, and is further a 35 USC 120 continuation-in-part of U.S. Ser. No. 14/593,010 entitled "Air Flow Limiter With Closed/Open Sensing" filed 9 Jan. 2015 in the name of Stephen B. Maguire. Applicant claims the priority of all of these pending utility patent applications as well as the priority, under 35 USC 119 and 120, of provisional U.S. patent application 62/027,379 filed 22 Jul. 2014 in the name of Stephen B. Maguire, entitled "Central Vacuum Loading System Without Central Control".

TECHNOLOGICAL BACKGROUND

This invention relates to manufacture of plastic articles and more particularly relates to pneumatic conveyance and processing of plastic resin pellets prior to molding or extrusion of those pellets into a finished or semi-finished plastic product.

In this patent application, injection and compression molding presses and extruders are collectively referred to as "process machines."

The plastics industry is very diversified; there are thousands of different products, hundreds of materials, and dozens of processes, and all are very different from one another. The only thing all these differences share in common is that the source material is some type of plastic.

Equipment sold to this industry is, therefore, very diversified in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes, called Gaylords, in fiber drums, in 50 pound bags, or more typically may be delivered by bulk truck or rail car, with the resin material then being transferred in bulk into storage silos. In all cases the resin material must be further distributed throughout the plant to each and every process machine. For that reason a great deal of design and capital expense is devoted to the automatic distribution of the raw resin material throughout the plant.

These resin distribution systems, more commonly referred to as "Loading Systems", must deal with many variables. One set of variables includes the type, shape, size and consistency of the granular material.

Resin pellets, nominally about ⅛ inch in size, come in various shapes, with round, square, and cylindrical being the most common.

Flowing resin powder is also an option, and very fine but free flowing resin pellets and other granular materials may be conveyed as well.

The design variables to be considered for each customer include:
1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each machine.
7. Total throughput rate of resin for the entire plant.
8. Excess capacity performance margin so a molding or extrusion process is not interrupted by short term loading issues.
9. Loss of resin material from or at the supply so that only air is being pulled, thereby reducing system vacuum levels and reducing overall design throughput.
10. Loading sequence, or priority, when multiple receiver stations call for material.
11. Detecting problems and alarm conditions.
12. Proper air to material ratio for resin conveying.
13. Detecting plugged lines due to poor resin flow or over feeding of resin material.
14. Dust condition and filter requirements.
15. Reliability.
16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations is to hold a correct velocity for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin film on the wall. Strings of very thin "angel hair" accumulate, effectively reducing diameter of the conduit and causing problems in the system.

Air speed and resin conveying velocity are directly related to pump capacity (rated CFM) and horsepower, as well as conveying line diameter. There is always a correct velocity "range" for each type of resin material. It is a design challenge to assure that resin material is conveyed within the correct velocity range.

Conveying distances affect system design. Conveying over short distances requires a less powerful vacuum source then over longer distances. Systems are generally sized to produce the best compromise for material velocity between the shortest and longest conveying distance.

Required conveying rate usually dictates line size (tube diameter), and this in turn dictates the CFM required to maintain correct velocity in a given diameter conduit. This means different tube sizes in the same system can be a problem if one vacuum pump is to draw air and resin through several different diameter conveying lines. Pumps have known CFM ratings. Pulling air through a small tube will result in higher velocity flow than pulling the same CFM through a larger tube.

Excessive velocity can damage pellets.

The type of vacuum pump to be selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of distance, rate requirement, or material.

BACKGROUND OF THE INVENTION

Description of the Prior Art

Current resin central loading systems concerned with conveying granular plastic resin pellets from a storage area for molding or extrusion typically include a vacuum pump or pumps and multiple receivers.

In some systems, with many receivers, several small pumps are used.

It would be less expensive to use only one, or fewer, larger pumps. However, a larger pump may draw too much air with resulting damage to the material being conveyed. While a larger pump could load several receivers at once, there is a risk that an "open" line, namely a line pulling only air, and no resin material, would cause the vacuum to drop too much, and no resin would load. Also, when only one receiver is loading resin, air velocity might be too high, again with a risk of damaging the resin.

Nevertheless, in facilities that fabricate plastic products by molding or extrusion, it is common to use such vacuum loading systems to pneumatically convey pellets of thermoplastic resin, prior to molding or extrusion of those pellets into a finished or semi-finished product. The plastic resin pellets are typically purchased in 50 pound bags, 200 pound drums, or 1,000 pound containers commonly referred to as "Gaylords."

A preferred approach for conveying plastic resin pellets from a storage location to a process machine, which approach is often used in larger facilities, is to install a central vacuum pump or even several vacuum pumps, connected by common vacuum lines to multiple "receivers."

Vacuum pumps connected to the vacuum lines draw vacuum, namely air at pressure slightly below atmospheric, as the vacuum pump sucks air through the "vacuum" line. The suction moves large quantities of air which carries thermoplastic resin pellets through the "vacuum" line.

An alternative is to use positive pressure produced by a blower or the exhaust side of a vacuum pump. With such an approach, the positive pressure results in movement of substantial amounts of air which may be used to carry the plastic resin pellets. However, the vacuum approach of drawing or sucking pellets through the system conduits is preferable to the positive pressure approach of pushing the resin pellets through the system conduits.

In practice, vacuum pumps are preferred and vacuum lines are desirable in part because power requirements to create the required vacuum necessary to draw plastic resin pellets through the lines are lower than the power requirements if the plastic resin pellets are pushed through the lines by a blower or by the exhaust side of a vacuum pump. When vacuum is used, the static pressure within the line may be not much less than atmospheric. When positive pressure is used, the dynamic pressure of the air flowing through the line must be relatively high in order to move an adequate quantity of plastic resin pellets.

As used herein, and in light of the foregoing explanation, the terms "vacuum pump" and "blower" are used interchangeably.

When one or more central vacuum pumps are connected to multiple receivers, a receiver is typically located over each temporary storage hopper, in which the plastic resin pellets are temporarily stored before being molded or extruded. A temporary storage hopper is typically associated with each process machine.

In current practice, the receiver is connected by a control wire to a central control system. The control system works by selectively opening a vacuum valve located in each receiver, allowing one or several vacuum pumps to work in sequence drawing "vacuum", i.e. below atmospheric pressure air, to carry the pellets among and to multiple receivers as individual ones of the receivers, positioned over individual hoppers associated with the individual process machines, require additional plastic resin pellets. The receiver for a given hopper-process machine combination is actuated by opening the vacuum valve located in or near the receiver, causing the receiver to supply plastic resin pellets by gravity feed into the hopper from where the pellets may be fed further by gravity downwardly into the associated process machine.

Large, high capacity industrial vacuum pumps are reliable and are suited to heavy duty industrial use. Large high capacity vacuum pumps allow long conveying distances for the plastic resin pellets. Currently available large capacity vacuum pumps permit plastic resin pellets to be conveyed over distances of 200 feet or more using vacuum drawn by the pump. Use of such high capacity vacuum pumps results in a big rush of below atmospheric pressure air through the line, carrying the plastic resin pellets over a long distance.

Operators of plastic manufacturing facilities prefer to buy plastic resin pellets in bulk, in rail cars or tanker trucks. Bulk purchases result in cost savings. Plastic resin pellets delivered in bulk are typically pumped into large silos for storage. In a large manufacturing facility, the distance from a plastic resin pellet storage silo to a process machine may be several hundred feet, or more. Accordingly, when plastic resin pellets are purchased in bulk, a central vacuum-powered conveying system, powered by one or more large, high capacity industrial vacuum pumps, is a necessity.

Typically, large central plastic resin pellet conveying systems have one or more vacuum pumps, each typically from 5 to 20 horsepower. These central systems include central controls connected by wire to each receiver associated with each process machine in the facility. Typically eight, sixteen, thirty-two or sixty-four receivers, each associated with a process machine, may be connected to and served by the central plastic resin pellet vacuum conveying system. Of course, the higher the number of receivers served by the system, the higher the cost.

A factor to be considered in designing such a system is the speed of the plastic resin pellets as they flow through a conduit as the plastic resin pellets are carried by the moving air stream drawn by the vacuum pump. If air flow is too slow, the plastic resin pellets fall out of the air stream and lie on the bottom of the conduit, with resulting risk of clogging the conduit. If air flow is too fast, the plastic resin pellets can skid along the conduit surface. In such case, harder, more brittle plastic resin pellets may be damaged, resulting in dust within the conduit, which when drawn into the vacuum pump can damage the vacuum pump and render the system inoperative. Softer plastic resin pellets heat up and can melt from friction when contacting the conduit interior surface. This results in "angel hair"—long, wispy-thin strands of plastic film which eventually clog the conduit and cause the system to shut down.

For these reasons, pneumatic plastic resin pellet conveying systems must be designed to produce desired, reasonable conveying speeds for the plastic resin pellets.

Currently, conveying speed of the plastic resin pellets is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is conventionally done by properly specifying the vacuum pump by capacity and, in some cases, by varying speed of the vacuum pump as the vacuum pump draws the air in a "vacuum" condition through the conduit, carrying plastic resin pellets in the moving, below atmospheric pressure air. Controlling cubic feet per minute of air flow is an indirect way of controlling plastic resin pellet speed as the plastic resin pellets flow through a conduit of a given diameter.

Typically, a 2 inch diameter conduit requires about 60 cubic feet per minute of air flow to convey typical plastic resin pellets. A 2½ inch diameter conduit typically requires about 100 cubic feet per minute of air flow to convey typical plastic resin pellets. To achieve these desired air flow volume flow rates, a conventional designer must carefully match the horsepower of a vacuum pump, which has a given cubic feet of air per minute rating, to a selected size conduit, taking into consideration the average distance the plastic resin pellets must be conveyed through the conduit from a storage silo to a receiver or loader. If this results in selection of a 5 horsepower blower/vacuum pump, then a given facility may require several such blowers/vacuum pumps, with each blower/vacuum pump supplying only a selected number of receivers.

A single plastic resin molding or extruding facility might theoretically require a 20 horsepower blower and the corresponding cubic feet per minute capability for the conveyance provided by the single blower to meet the total conveying requirements for plastic resin pellets throughout the facility. However, a single twenty horsepower blower would result in far too high a conveying speed for the plastic resin pellets through any reasonable size conduit. As a result, the conveying system for the plastic resin pellets in a large facility is necessarily divided and powered by three or four smaller blowers, resulting in three or four different, separate systems for conveyance of plastic resin pellets. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet conveying systems are not consistent. Air flow speed and cubic feet per minute capacity of blowers often vary and are outside of selected design and specification values.

SUMMARY OF THE INVENTION

The instant invention provides an improvement to known pneumatic plastic resin pellet conveying systems, reducing the costs of those systems while providing consistent control of delivered cubic feet per minute of air for individual receivers. The invention also facilitates easy expansion of the pneumatic plastic resin pellet conveying system as the system grows. Such expandable systems are made feasible by an inventive adjustable air flow limiter embodying aspects of this invention.

In one aspect of this invention, air flow control devices, most desirably of the type newly disclosed herein and only slightly less desirably of the type disclosed in co-pending U.S. patent application Ser. No. 14/185,016 entitled "Air Flow Regulator", filed 20 Feb. 2014 in the name of Stephen B. Maguire, and in co-pending U.S. patent application Ser. No. 14/593,010 entitled "Air Flow Limiter with Closed/Open Sensing", filed 9 Jan. 2015 in the name of Stephen B. Maguire, are added to each receiver so that the air pulled from any single receiver at the correct predetermined, preselected flow rate. This prevents excessive flow rates and "open" lines that dump too much air into the system.

Use of these air flow limiters allow one large pump to be used without risk to the system or to the resin being conveyed. An added advantage of a very large pump is that it can fill multiple receivers simultaneously with resin. As used herein, the term "receiver" denotes the type of apparatus disclosed in U.S. Pat. Nos. 6,089,794; 7,066,689, and 8,753,432. The disclosures of these patents are hereby incorporated by reference.

The invention allows receivers to "load" the resin the instant there is demand for material by dropping the material downwardly into a gravimetric blender or directly into a process machine. The receiver need not wait in the "queue" to load because no sequencing of the receivers is required. Each receiver is always "ready to go."

A central control station is not required, and neither is wiring from each receiver to a central control station, thus further reducing costs. As a result, there are one or several large vacuum pumps, with receivers that stand alone without need for a central control, and an air flow limiter on each receiver to assure proper and constant flow rate. This facilitates reducing the speed of the vacuum pump, to hold the desired vacuum level in the lines. This is in contrast to running the vacuum pump at full speed all the time.

"CFM" is a term referring to a cubic foot of air regardless of the density of the air. "SCFM" refers to a cubic foot of air at standard temperature and pressure, namely 70° F. at sea level. The air flow limiter holds SCFM constant. This means that air flow through the air flow limiter will be faster when the air is thin, such as at high altitudes, and slower when the air is thick, such as at sea-level. However, in both cases (or any case), the air flow limiter maintains SCFM, namely air flow in standard cubic feet per minute, constant. Stated differently, so long as the SCFM is held steady, as is the case with an air flow limiter, the same weight of air, or number of air molecules, flows through the limiter regardless of conditions. Air flow rate through the limiter may change in terms of the speed of the air, but in all cases the quantity of air flowing, measured in standard cubic feet per minute, is constant.

"VFD" (Variable Frequency Drive) motors allow vacuum pumps to operate at different speeds, and therefore at different CFM rates, with the vacuum pump pulling different vacuum levels depending on preset information about each receiver being served, and/or making adjustments based on real time feedback of vacuum sensors located at various places in the system.

The addition of a SCFM (Standard Cubic Feet per Minute) air flow limiter in the air flow line allows oversized vacuum pumps to be used without risk of conveying at excessive velocity. SCFM limiters restrict air flow to a preset SCFM. This maintains the desired SCFM air flow at the inlet, which is critical for proper conveying for a given size conveying line. This concept is the subject of pending U.S. patent application Ser. No. 14/185,016, referenced above.

Reading vacuum levels at various points tells the controlling processor if the line is open, which means only air (and no resin material) is present and air is flowing unrestrictedly. This signals a loss of material at the source. A high vacuum reading indicates a plugged or nearly plugged line. Normal conditions are present where material is flowing correctly at detected mid-vacuum levels.

One line size for all receivers assures the resin transport velocity is more likely to be in the acceptable range. However, most processes require the basic resin material be delivered at 50 times the rate of additives, such as color concentrate. Virgin (or natural) resin pellets may have to be loaded at a rate of 1000 pounds per hour, requiring a 2.5 or 3 inch line size, while color is only required to be delivered at a rate of 20 to 40 pounds an hour. A smaller receiver is used for color, namely a receiver that loads perhaps 5 pounds at a time, while the receiver for the virgin resin material will be larger, perhaps loading 50 pounds of each load cycle. A 2.5 inch line on a 5 pound receiver would be too large. 1.5 inch line would be standard, and the use of 1.5 inch resin conveying line would be better, but this risks velocities that are excessive, resulting in trade-offs in design.

By placing a flow limiter at the pump suction intake, one can limit the maximum SCFM air flow to the design limit of the air flow limiter device; as noted this is disclosed and claimed in pending U.S. patent application Ser. No. 14/185,016, referenced above.

In another embodiment, one air flow limiter is in place as a single air flow limiter at the vacuum pump suction inlet with the vacuum pump being connected to a plurality of receivers all connected in a system. This provides a selected, correct rate of air flow in standard cubic feet per minute. In this embodiment, only a single air flow limiter is used at the vacuum pump inlet, as opposed to the alternative embodiment described above where one air flow limiter is used at each receiver.

An advantage of using only a single air flow limiter of the type disclosed herein is that the vacuum pump can be sized and operated for the longest distance over which resin is to be conveyed in a given locale. This can be done while still protecting shorter runs of the system from excessive resin material velocity, where less vacuum is required. One air flow limiter costs less than having an air flow limiter located at every receiver; this provides an advantageous aspect to this approach.

By adding an improved air flow limiter manifesting aspects of this invention to every receiver, plant operators can control air flow in cubic feet per minute to a maintained, constant value that is ideal for that particular receiver, considering conduit diameter and distance over which the plastic resin pellets must be conveyed through that conduit. Alternatively, by adding an improved air flow limiter manifesting aspects of this invention just to the suction inlet of the vacuum pump, a plant operator can control air flow in cubic feet per minute to a constant value that is ideal for the system as a whole, considering conduit diameter and distance over which the plastic resin pellets must be conveyed to the multiple receivers in the system.

Use of the improved air flow limiter in accordance with this invention allows pneumatic plastic resin pellet conveying systems to utilize a single large high horsepower vacuum pump. In accordance with one embodiment of the invention, each receiver in a facility is preferably fitted with an improved air flow limiter so the flow for each receiver in cubic feet per minute is self-limiting. This approach eliminates the need to match vacuum pumps or blowers to a specific material conduit size or conveyance distance. Using this approach, the improved flow limiter permits operators to run a very large vacuum pump or blower at a speed that will maintain a desired high level of vacuum throughout the entire vacuum (or pneumatic) plastic resin pellet conveying system.

Using larger than standard diameter vacuum conduits allows a significant vacuum reserve to exist in the plastic resin pellet conveying system, without the need for a vacuum reserve tank. Larger diameter conduits also mean there is little loss of vacuum over long distances, even at the most distant receiver to which plastic resin pellets are supplied by the system. A variable frequency drive control may be used to adjust the speed of the vacuum pump to maintain air flow at the desired standard cubic feet per minute rate through the air flow limiter.

With the air flow limiter aspect of the invention facilitating use of high horsepower vacuum pumps or blowers, designers utilizing the invention can now design to load multiple receivers at the same time without fear of dropping vacuum levels too low in parts of the pneumatic or vacuum plastic resin pellet conveying system.

In the plastic resin pellet conveying system aspect of the invention, no central control system is required. Using the improved flow limiter, each receiver preferably controls its own operation and is not wired to any central control facility. When the level of plastic resin pellets in the hopper of a process machine falls sufficiently low, a level sensor preferably tells the receiver to load the hopper of the process machine. Coupled to the level sensor may be a vacuum sensor, which preferably confirms that the main system has sufficient vacuum available to load the receiver. If too many other receivers are currently loading, and the vacuum level is sensed to be below the threshold for effective loading, then the receiver associated with the sensor will wait until vacuum readings rise. When available system vacuum is sufficient to assure adequate flow of plastic resin pellets into a given receiver, the vacuum sensor causes a vacuum valve preferably associated with the receiver to open the connection of the receiver to the conduit carrying the plastic resin pellets, and the receiver fills with resin pellets.

In accordance with one aspect of the invention, each receiver acts on its own sensed information. Use of the high horsepower vacuum pump means that several receivers can load simultaneously.

The improved air flow limiter does several things to make such systems possible. By limiting cubic feet per minute of flow to a desired constant level, there is virtually no limit on the horsepower of the vacuum pump. The risk of a too high a conveyance speed of the plastic resin pellets through the conduit is eliminated. Additionally, if a receiver is not drawing in plastic resin pellets but is just drawing air as a result of the main supply of plastic resin pellets being exhausted, the empty conduit of the conveying system would ordinarily convey a substantial amount of air, which normally would drop the vacuum reserve of the entire pneumatic conveying system very rapidly. But with the air flow limiter, such dumping of air into the conveying conduit is at least substantially reduced, and if the air flow limiter is at the suction intake of the vacuum pump, such dumping of air into the system is essentially impossible.

Further contributing to minimized air dump into the vacuum conduit is the ability of the receiver to detect system failure or absence of material being loaded, thereby stopping further load cycles and sounding an alarm.

In the air flow limiter aspect of the invention, the limiter preferably has a valve which relies on two opposing forces, gravity in one direction and "lift" created by air flow in the opposite direction. Because the improved air flow limiter uses gravity to close the valve portion of the limiter, orientation of the air flow limiter is important. Air flow must be upward, essentially vertically through the air flow limiter, to counter the downward force of gravity.

The improved air flow limiter is desirably in the form of a tube with an air flow actuated valve within the tube. In a "no flow" condition, gravity holds the valve closed. However, as air flow through the limiter reaches a pre-selected design value, air flowing over and against a sail-like plate lifts an internal free floating valve. This shuts off air flow through the air flow limiter if the free floating valve rises sufficiently to contact an adjustable stop located within the tube. In one position, the adjustable stop provides for some air flow through the air flow limiter when the free floating valve has contacted the stop. In a second position of the adjustable stop, once the free floating valve contacts the stop in the second position, no air flow can flow through the air flow limiter.

By adjusting the size and/or shape of the "sail", and/or the weight of the free floating valve, and/or the position of the adjustable stop, desired air flow in standard feet per minute can be regulated very closely. Gravity as a force in one direction means the opening force is constant over the full range of motion of the valve device. (A spring, if one were used, would provide a variable force. However, use of gravity in the air flow limiter aspect of the invention eliminates that variable).

In the air flow limiter aspect of the invention, at the desired design standard cubic feet per minute of air flow, the valve opens as air lifts it. The valve would continue moving upwardly except for the fact that the valve reaches a point of air flow restriction, where the valve holds air flow steady at the desired design value. If the valve moves further upwardly in response to additional air flow, to either a first position at which the adjustable stop contacts the valve and the valve remains partially open, or if the valve moves further upwardly and contacts the stop when the stop is at a second position which is preferably a "valve closed" position, this either reduces air flow and resulting force in the valve (if the valve contacts the stop at the first position) or stops all air flow through the limiter (if the stop is at the second position). The valve may then drop in response to gravity.

If the valve drops below the position corresponding to the designed air flow level, this allows more air flow and consequently the valve rises as the air pushes the valve upwardly. As a result, the valve reaches the desired design valve equilibrium control point essentially instantly and very accurately. A detector of the type disclosed in the aforementioned '010 application may be used to detect position of the valve and may be used to actuate the stop to change the stop from the first stop position to the second position, if desired.

Known air flow shutoffs are subject to "vacuum pull", causing them to shut off completely once air begins to flow. This is because in known shutoffs, vacuum "pull" of the vacuum pump is always present. In the air flow limiter of the invention, a short vertical tube closes against a flat horizontal surface. In the air flow limiter of the invention, air flow is directed through the center of the short tube and escapes over the top edge of the short tube and then around open edges of a flat shutoff surface. A flat, desirably triangular or star-shaped plate is positioned in the air flow below and connected to the short tube. This plate acts as a sail in the air flow and will, at the designed desired standard cubic feet per minute air flow rate, provide enough lift to raise the short tube against either the stop if the stop is at the first position or the stop and the shutoff plate if the stop is at the second position where the stop is at least flush with and perhaps withdrawn slightly from the plane of the shutoff plate.

At complete shut off, with the stop at the second position and thereby being at least flush and perhaps withdrawn from the flat shutoff plate surface, with vacuum above the flat plate shutoff surface and air at some pressure below the flat shutoff plate surface, most of the air pressure forces are against the walls of the short tube. Those forces are radially outwardly directed. Specifically, they are horizontal due to the configuration of the air flow limiter, and do not exert vertical force that would make the movable portion of the valve, namely the short tube, move in a vertical direction.

The surface of the end of the short tube, at the short tube end edge, is a horizontal surface and can provide a small vertical force on the tube when air travelling upwards impinges on the surface. For this reason, the air flow limiter of the invention uses a very thin wall short tube, to minimize this horizontal surface area of the short tube.

In the air flow limiter of the invention, air flow rate in cubic feet per minute can be adjusted by adding or subtracting weight from the floating valve, or by adjusting the surface area of the sail, or by adjusting the size or shape of the sail in the air flow or by adjusting the position of the "stop" against which the floating valve abuts at an extremity position of valve travel.

Accordingly, in one of its aspects, the invention provides a resin delivery system and method that includes an air flow limiter having a preferably vertically oriented tube, a pair of open-ended preferably telescoping tubular internal segments within the tube, with an outer tubular segment preferably being fixed and the other preferably being slidably moveable along the fixed segment in the axial direction. The air flow limiter further includes a plate extending partially across the interior of the vertically oriented tube and positioned for contacting the moveable one of the telescoping tubular segments and limiting travel of the moveable telescoping tubular segment, with the plate covering the upper, open end of the moveable telescoping tubular segment upon contact therewith.

In this aspect, the invention preferably yet further includes a sail positioned in the vertically oriented tube below the telescoping segments and a strut preferably connecting the sail and the moveable telescoping tubular segment. A baffle may be provided and preferably be positioned to direct upward air flow within the tube through the telescoping tubular segments. The moveable telescoping tubular segment preferably moves vertically within the tube, unitarily with the sail, responsively to air flow upwardly through the tube against the sail.

The air flow limiter of the invention in one of its aspects further provides an actuator connected to the plate for selectively limiting travel of the moveable tubular segment with the actuator providing a "stop" in at least two positions. In one extended position, the actuator, which is preferably a solenoid, extends the stop to limit travel of the moving telescopic tubular segment to a degree that air flow is still permitted through the limiter; at a second position, the stop is desirably flush with or withdrawn into the plate defining the extreme upper limit of travel of the stop. The stop is preferably provided in the form of a piston portion of a solenoid, with the solenoid actuating the piston between the first and second positions defining the stop.

The tubular segments are preferably cylindrical; the surface of the plate contacted by the moveable tubular segment is preferably planar; and the portion of the moveable tubular segment contacting the plate surface is preferably annular. A detector portion of the limiter, if provided, preferably detects an electromagnetic beam, most preferably a visible light beam or an infrared beam to determine when the portion of the moveable tubular segment has contacted the plate surface.

In a variation of terminology, a surface of the plate contacted by the moveable tubular segment is flat, the tubular segments are cylindrical and the circular edge of the tubular segment contacting the plate service is annular and normal to the axis of the tubular segment.

In yet another one of its aspects, this invention provides a resin delivery system having at least one adjustable air flow limiter consisting of a vertically oriented tube, a tubular segment within the tube, which segment is moveable in the axial direction, a plate extending at least partially across the interior of the tube for contacting the movable tubular segment and defining a limit of travel of the moveable tubular segment, a sail positioned in the tube below the moveable tubular segment and being moveable vertically within the tube, and a strut connecting the tubular segment and the sail, with a stop for limiting travel of the moveable tubular segment being adjustably mounted on the plate for providing two limits of travel for the moveable tubular segment. A baffle may be provided connected to and located within the tube defining a lower limit of travel of the moveable tubular segment upon contact of the strut with an upper extremity of the baffle. The moveable tubular segment is in sliding telescoping engagement with the tubular portion of the baffle, directing upward air flow within the tube, with the moveable tubular segment being moveable unitarily with the sail in response to upward air flow through the tube contacting the sail.

In yet another one of its aspects, this invention provides a resin delivery system that includes at least one air flow limiter, which is preferably adjustable, having a vertically oriented tube with a sail assembly positioned in the tube and moveable therewithin responsively to air flow through the tube to regulate air flow through the tube and to stop air flow thorough the tube upon air flow exceeding a preselected value expressed in standard cubic feet per minute.

In yet another one of its aspects, this invention provides a method for conveying granular plastic resin by controlled air flow where air flow control involves the steps of providing a vertically oriented tube, positioning a moveable sail assembly including a sail within the tube, positioning an adjustable stop within the tube, and permitting the sail assembly to move responsively to air flow through the tube between a position at which air flows around the sail assembly and through the tube, and a position at which the sail assembly contacts the stop and blocks air flow through the tube.

In yet another one of its aspects, this invention provides a pneumatic resin delivery system utilizing air flow limiting apparatus including a vertically oriented first tube, a vertically oriented second tube which is moveable along and within the first tube, a guide within the first tube for limiting the second tube to vertical co-axial movement within and relative to the first tube, a sail within the first tube being connected to the second tube and being moveable responsively to air flow within the first tube, and a moveable, adjustable stop within and connected to the first tube for limiting vertically upward travel of the second tube.

In still another one of its aspects, this invention provides apparatus for conveying granular plastic resin from a supply to receivers that retain and dispense the resin when needed by a process machine, where the apparatus includes a vacuum pump, an adjustable single air flow limiter connected to a suction head of the vacuum pump, a first conduit connecting the receivers to the air flow limiter, and a second conduit connecting the granular material supply to the receivers. In this embodiment of apparatus of the invention, suction created by operation of the vacuum pump draws granular plastic resin from the supply into the receivers through the second conduit and draws air from the second conduit through the receivers, the first conduit and the air flow limiter. The air flow limiter is oriented in a vertical direction for vertical flow of air upwardly therethrough. An emitter-detector combination may be provided and, if so, is preferably oriented to provide a beam within and passing through a tubular housing portion of the air flow limiter with the beam preferably being perpendicular to the air flow limiter axis. The adjustable feature of the single air flow limiter is preferably provided by a solenoid mounted so that the solenoid piston moves between first and second positions thereby to adjust the limit of travel for a moveable valve member portion of the air flow limiter.

In yet still another aspect, this invention provides apparatus for conveying granular plastic resin material from a supply of resin material to receivers that retain and dispense the resin material when needed by a process machine, where the apparatus includes a vacuum pump, air flow limiters connected to outlets of the receivers, with the air flow limiters being vertically oriented for vertical flow of air drawn by suction therethrough, a first conduit connecting the air flow limiters to a suction head of the vacuum pump and a second conduit connecting the granular resin material supply to the receivers. In this apparatus aspect of the invention, suction created by operation of the vacuum pump draws granular plastic resin from the supply of granular plastic resin material into the receivers through the second conduit, and also draws air from the second conduit through the receivers, the air limiters, and the first conduit. In this second embodiment, at least one of the air flow limiters preferably consists of a tube, a tubular segment within the tube that is moveable in the axial vertical direction, a plate extending at least partially across the interior of the tube for contacting the moveable tubular segment in combination with a solenoid mounted on the plate, with the solenoid piston defining a limit of vertical travel of the moveable tubular segment when the solenoid piston is extended and the plate and solenoid together defining a limit of vertical travel of the moveable tubular segment when the solenoid piston is retracted, a sail connected to the moveable tubular segment and being moveable therewith within the tube, and a baffle connected to and within the tube defining a second limit of vertical travel of the moveable tubular segment, where the moveable tubular segment is in sliding telescoping engagement with a tubular portion of the baffle. The moveable tubular segment moves unitarily with the sail in response to vertical air flow through the tube contacting the sail.

DESCRIPTION OF THE PREFERRED EMBODIMENT AND BEST MODE KNOWN FOR PRACTICE OF THE INVENTION

In this application, unless otherwise apparent from the context it is to be understood that the use of the term "vacuum" means "air at slightly below atmospheric pressure." The "vacuum" (meaning air at slightly below atmospheric pressure) provides a suction effect that is used to draw granular plastic resin material out of a supply and to convey that granular plastic resin material through various conduits to receivers where the granular resin material can be temporarily stored before being molded or extruded. Hence, when reading this application it is useful for the reader mentally to equate the term "vacuum" with the term "suction".

This invention provides an improvement on the air flow limiters disclosed and claimed in pending U.S. patent application Ser. Nos. 14/185,016 and 14/593,010 referenced above.

Figure 14:
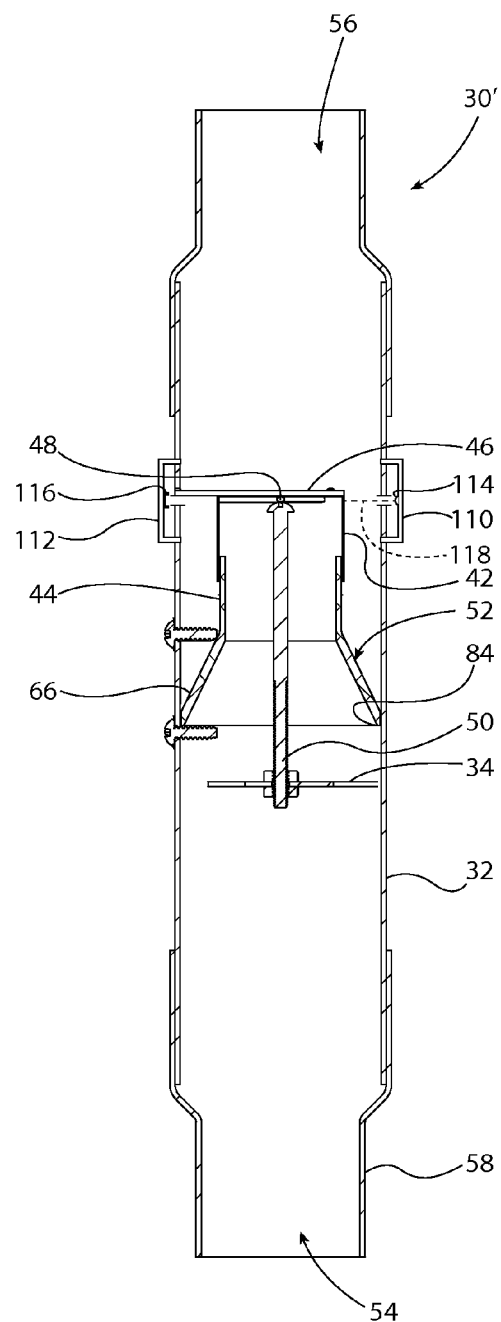
FIG. 14 is a sectional view in elevation, similar to FIG. 13, of the air flow limiter disclosed in FIG. 13 and in co-pending U.S. patent application Ser. No. 14/593,010, with the detector beam being blocked by the moveable valve portion of the air flow limiter, thereby indicating no air flow through the air flow limiter.

With the improved air flow limiter of this invention, there are effectively two "design limits" where "design limit" denotes the maximum air flow allowable through the air flow limiter. In the air flow limiter of the invention, a first "design limit" occurs an air flow through the air flow limiter is sufficient to move moveable sail 34 and hence moveable internal segment 42 upwardly to a position at which moveable internal tubular segment and the assembly of first and second struts 48, 50 contact piston 124 of solenoid 120, when piston 124 is extended from solenoid 120 and is at the position illustrated in FIG. 15. When the assembly of first and second struts 48, 50 moves slightly upwardly from the position illustrated in FIG. 15 and contacts the lower extremity of piston 124, when piston 124 is extended from solenoid 120 as illustrated in FIG. 14, this defines a first "design limit." Air flow through air flow limiter 30" when the assembly of struts 48, 50 contacts the lower extremity of piston 124 when extended is one of the two "design limits." The second design limit occurs when the assembly of struts 48, 50 is just below and about to touch flow limiting plate 46. With air flow through flow limiter 56 with the struts 48, 50 at that position, air flow though limiter 30" is at a maximum. Once air flow increases even slightly, the air flow impinging sail 34 pushes assembly of struts 48, 50 and hence moveable tubular segment 42 upwardly against flow limiting plate 46, and flow through flow limiter stops. Consequently, the air flow through limiter 30" when the upper extremity of moveable tubular segment 42 is just short of flow limiting plate defines the second "design limit" of air flow through limiter 30".

Regarding nomenclature, "30" denotes the limiter illustrated in FIGS. 1 through 12; "30'" denotes the limiter illustrated in FIGS. 13 and 14; and "30" denotes the limiter illustrated in FIGS. 15 and 16. With the large number of common parts and operating characteristics common to these three limiters, sometimes the designators "30" and "30 etc." are used to refer to all of these limiters; the context makes clear as to when a specific characteristic of one of the limiter is the subject of the text.

When air flow is below the first design limit, limiter 30 remains fully open. The moment air flow equals the first design limit, the assembly of struts 48, 50 carrying moveable tubular segment 42 contacts the circular surface, unnumbered in the drawings, of piston 124 when piston 124 is in its extended position relative to solenoid 120. So long as piston 124 remains extended from solenoid 120, air flow through limiters 30 etc. cannot exceed the first design limit.

Figure 16:
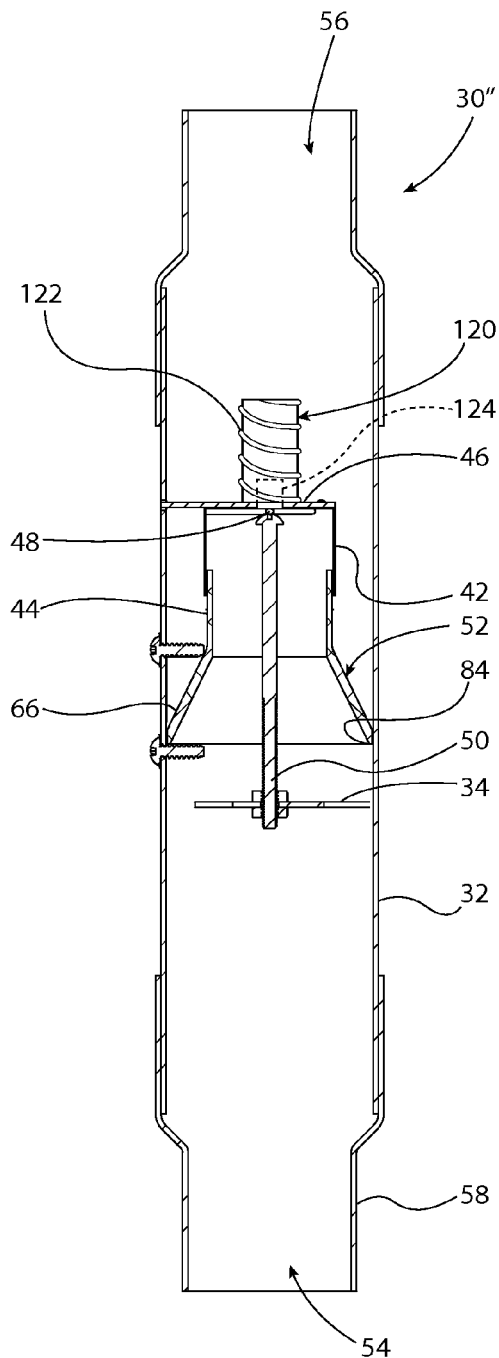
FIG. 16 is a sectional view in elevation of the adjustable air flow limiter illustrated in FIG. 15, with the "stop" illustrated in FIG. 15 withdrawn and the air flow limiter internal parts in position whereby no air can flow through the air flow limiter due to those internal parts now having blocked air flow due to instantaneous air flow exceeding the maximum design value.

However, once solenoid 120 is de-actuated and piston 124 retracts into solenoid 120 to the position illustrated in FIG. 16, air flow through limiters 30 etc. can increase up to the second design limit which, as noted above, occurs as moveable internal tubular segment 42 is approaching and in close proximity to flow limiting horizontal plate 46.

Figure 1:
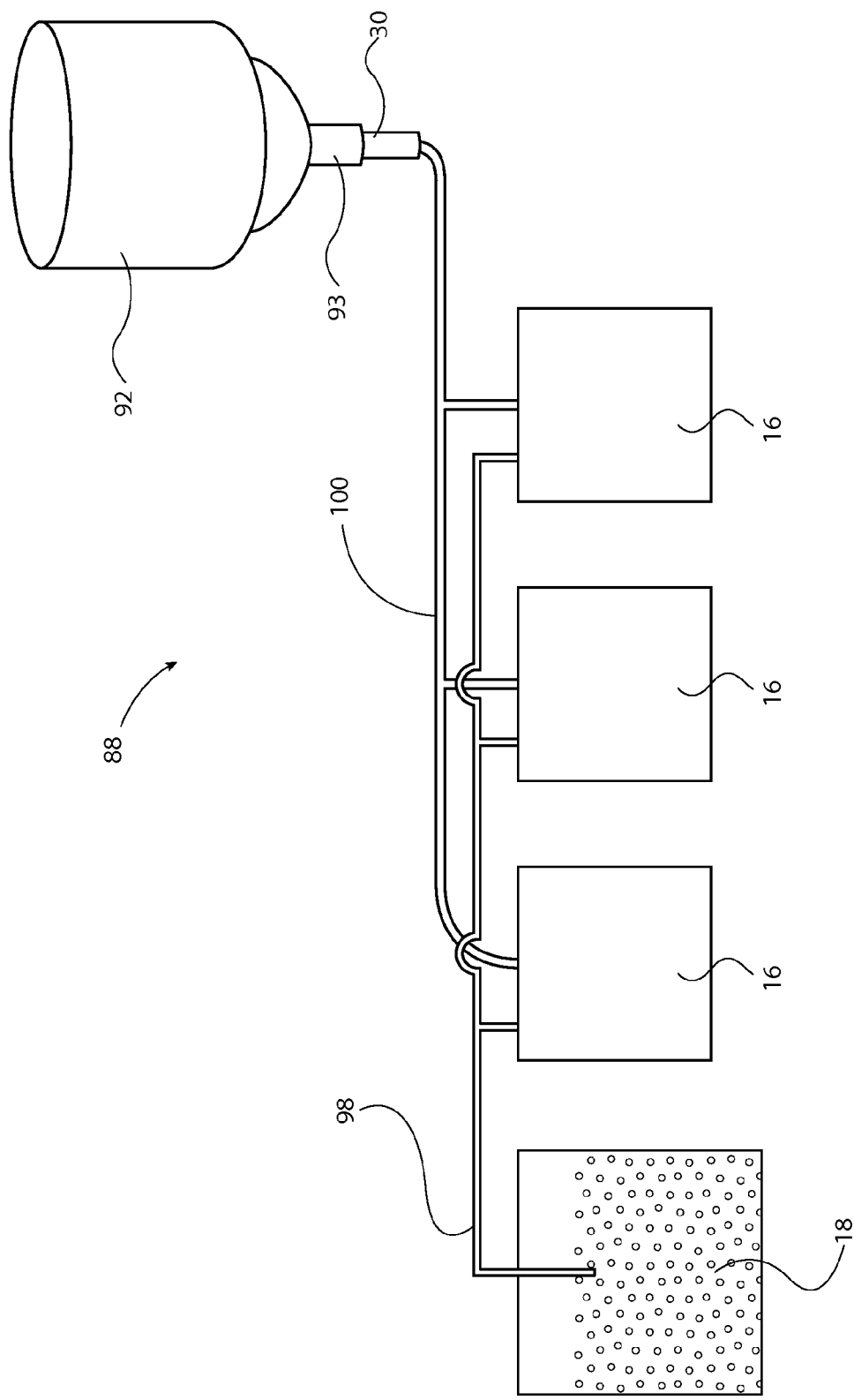
FIG. 1 is a schematic representation of a resin delivery system with a single air flow regulator in accordance with aspects of the invention.

Apparatus for conveying granular plastic resin material from the supply to receivers that retain and dispense the resin material when needed by a process machine is illustrated in FIG. 1. The apparatus, which is designated generally 88 in FIG. 1, preferably includes a vacuum pump designated generally 92 and shown schematically in FIG. 1. The vacuum pump preferably includes a vacuum pump suction head 93 also shown schematically in FIG. 1. Connected to the vacuum pump suction head 93 is an airflow limiter 30 shown only in schematic form in FIG. 1, but shown in detail in various forms in FIGS. 3 through 16. Airflow limiter 30 receives vacuum drawn by vacuum pump 92 through vacuum drawing conduit 100.

Vacuum drawing conduit 100 is connected to a plurality of receivers 16, each of which receives, retains and dispenses, as needed, granular plastic resin material to a process machine, such as a granulator blender, or an extruder, or a molding press preferably located below a receiver 16. The process machines are not illustrated in FIG. 1 to enhance the clarity of the drawing.

Further illustrated in FIG. 1 is a hopper 18 for storage of granular plastic resin material therein and a resin conveying conduit 98, which serves to draw resin from hopper 18 and to deliver the resin through resin conveying conduit 98 to the respective receivers as vacuum is drawn by the vacuum pump, with vacuum propagating through air flow limiter 30, vacuum drawing conduit 100, the various receivers 16, and resin conveying conduit 98, back to hopper 18.

Figure 2:
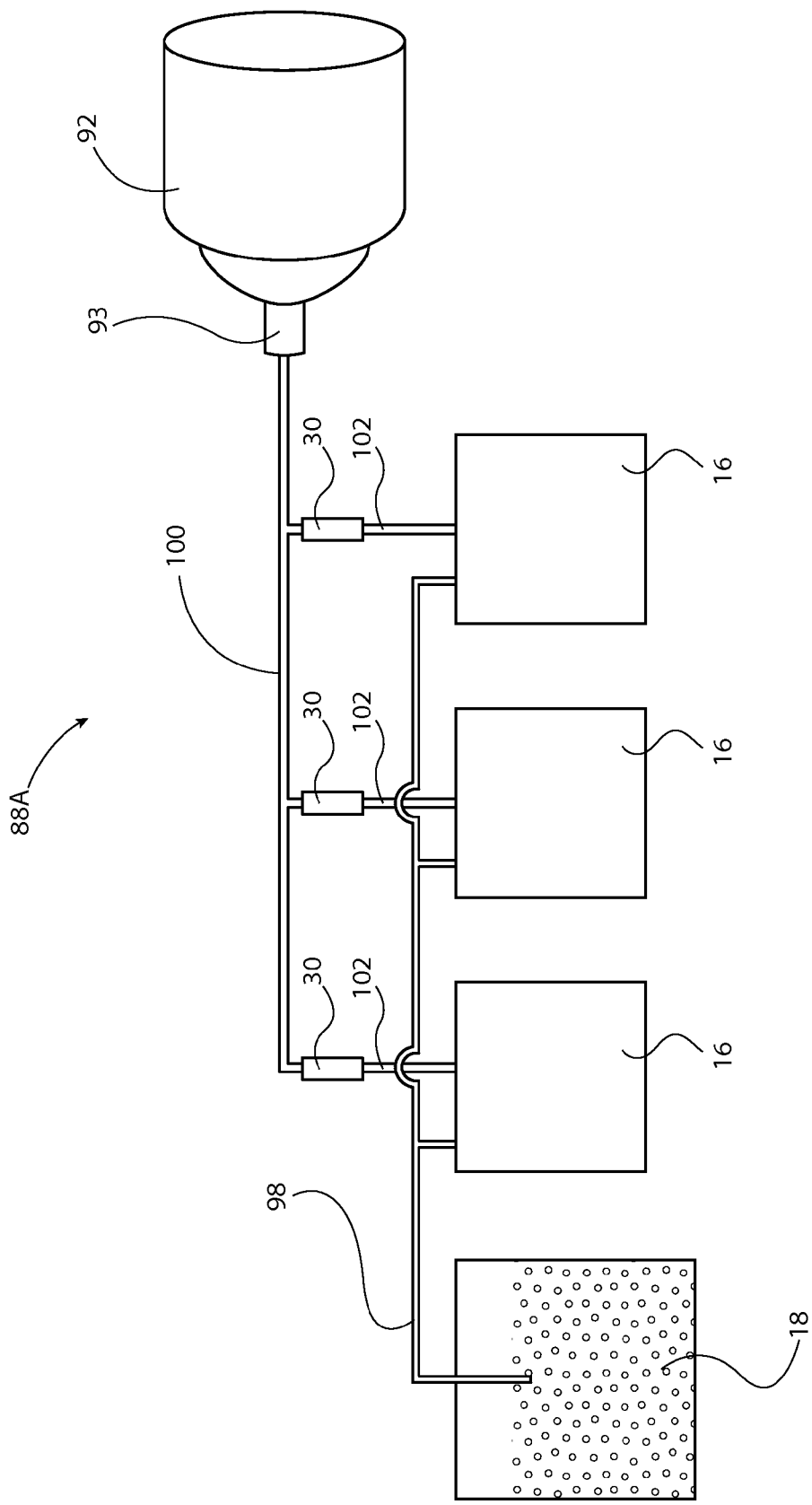
FIG. 2 is a schematic representation of a resin delivery system with a plurality of air flow regulators in accordance with aspects of this invention.
Figure 3:
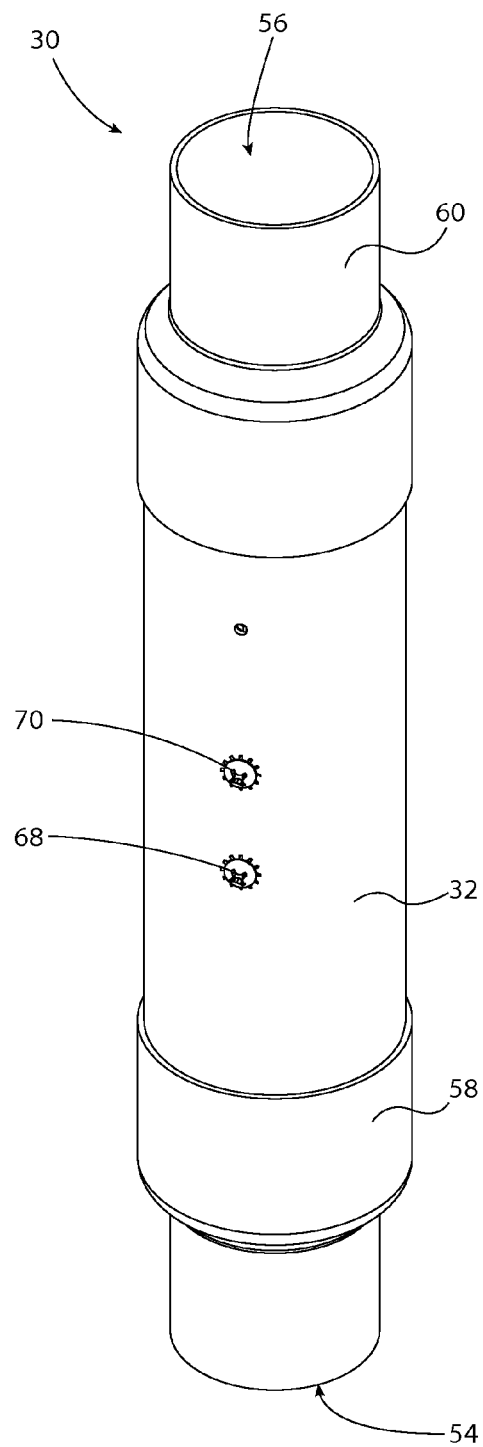
FIG. 3 is an isometric view of the exterior of an air flow limiter portion of apparatus for pneumatically conveying granular plastic resin as disclosed in co-pending application Ser. Nos. 14/185,016 and 14/574,561 referenced above.
Figure 4:
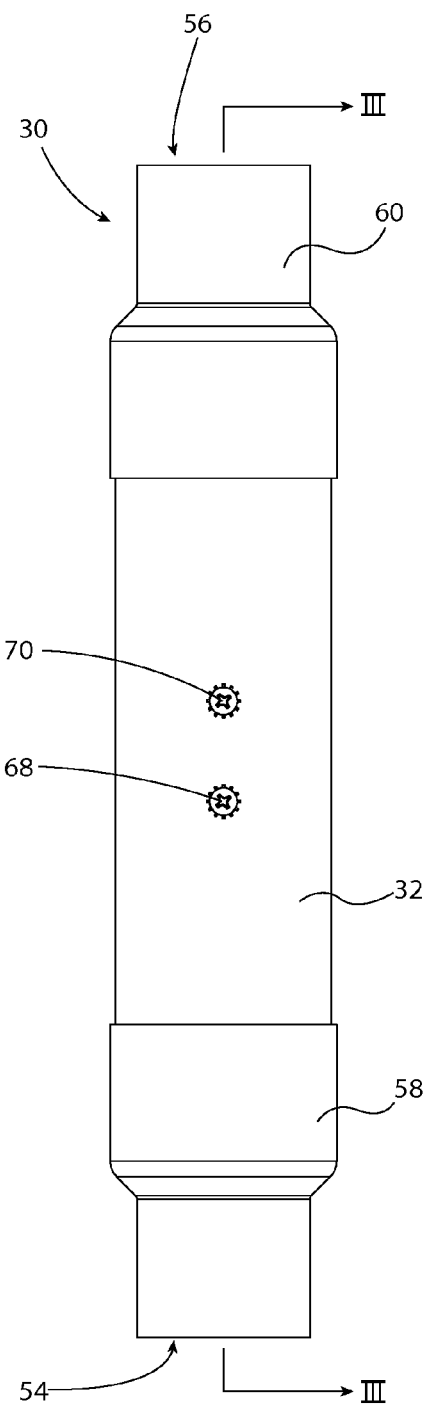
FIG. 4 is a front elevation of the air flow limiter illustrated in FIG. 3.

FIG. 2 shows an alternate embodiment of a resin conveying system designated 88A. FIG. 2, like FIG. 1, depicts a vacuum pump 92 shown in schematic form having a vacuum pump suction head 93 also depicted in schematic form. In the alternate embodiment illustrated in FIG. 2, vacuum drawing conduit 100 leads directly into and communicates with vacuum pump suction head 93. In the embodiment illustrated in FIG. 2, an air flow limiter 30 is provided for each receiver 16, with the air flow limiter 30 for a respective receiver 16 being located in a portion of a connection conduit 102 that connects a respective receiver to vacuum drawing conduit 100. In FIG. 2, each air flow limiter 30 is depicted in a vertical orientation, just as is airflow limiter 30 depicted in a vertical orientation in FIG. 1. Each receiver is connected by connection conduit 102 to vacuum drawing conduit 100 with air flow limiter 30 forming a portion of connection conduit 102.

In FIG. 2, as in FIG. 1, a first conduit 98 serves to convey granular plastic resin from hopper 18 to the respective receivers in response to vacuum drawn by vacuum pump 92 as that vacuum propagates from vacuum pump 92 through second conduit 100, connection conduits 102, receivers 16, and resin conveying conduit 98 to hopper 18.

During operation of the resin conveying systems shown schematically in FIGS. 1 and 2, upon actuation of vacuum pump 92, a vacuum is drawn at vacuum pump suction head 93. This vacuum, as it propagates back to hopper 18, serves to draw resin out of hopper 18 and into the respective receivers 16. In the embodiment illustrated in FIG. 2, individual air flow limiters 30 limit the suction or vacuum drawn by vacuum pump 92 through a given associated receiver 16. In the embodiment illustrated in FIG. 1, a single air flow limiter 30 limits the vacuum drawn through all of receivers 16 of the granular resin conveying system illustrated in FIG. 1.

Referring to FIGS. 1 and 2, the air flow limiter 30 portion of the resin delivery systems is preferably in the general form of a vertically oriented tube, preferably having inlet and outlet ends 54, 56 respectively. The tubular character of air flow limiter 30 is apparent from FIGS. 3 through 16, where air flow limiter 30 preferably includes a vertically oriented exterior tube 32, with open-end caps 58, 60 defining and providing open inlet and outlet ends 54, 56 respectively. End caps 58, 60 are open, of generally cylindrical configuration, and are configured to fit closely about vertically oriented tube 32 so as to provide a substantially air tight fit between end caps 54, 56 and tube 32.

Figure 5:
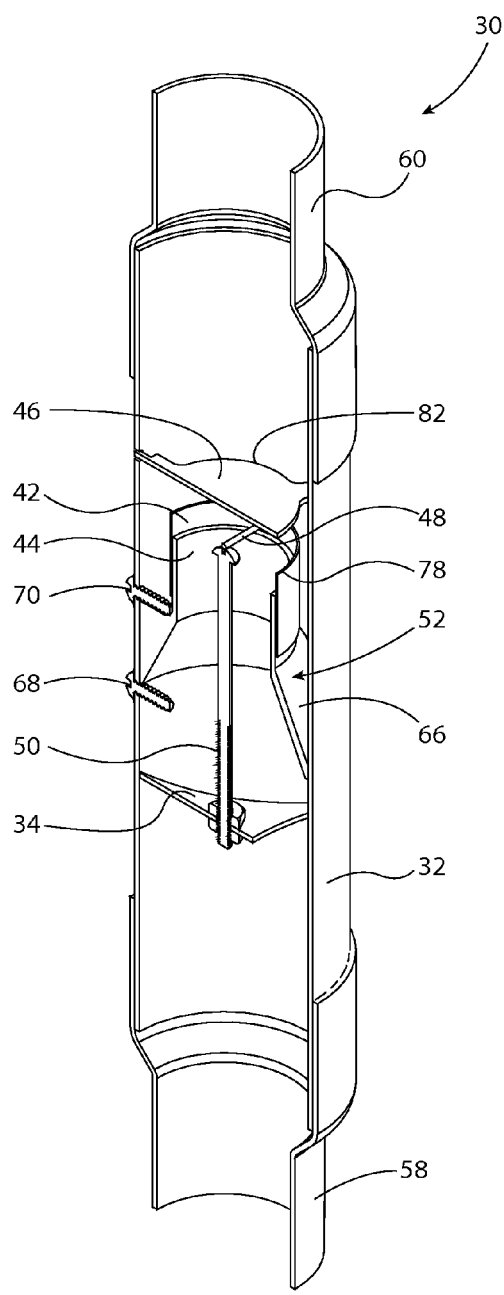
FIG. 5 is an isometric sectional view of the air flow limiter illustrated in FIGS. 3 and 4, with the section taken at arrows 3-3 in FIG. 4.

As illustrated in FIG. 5, air flow limiter 30 preferably includes, within vertically oriented exterior tube 32, a horizontally positioned plate 46, which is oriented perpendicularly to the axis of tube 32. Plate 46 is preferably configured as a circular disk of lesser diameter than the inner diameter of vertically oriented tube 32, with plate 46 further preferably including three legs extending outwardly from the circular interior disk portion of plate 46. Legs of plate 46 are designated 62 in FIG. 9, while the circular interior portion of plate 46 is designated 64 in FIG. 9. Plate 46 is secured to the interior of vertically oriented outer tube 32 by attachment of legs 62 to the interior surface of tube 32. Any suitable means of attachment, such as by welding, adhesive, mechanical screws, or end portion of legs 62 defining tabs fitting into slots within tube 32 as shown in FIG. 5, may be used.

Figure 6:
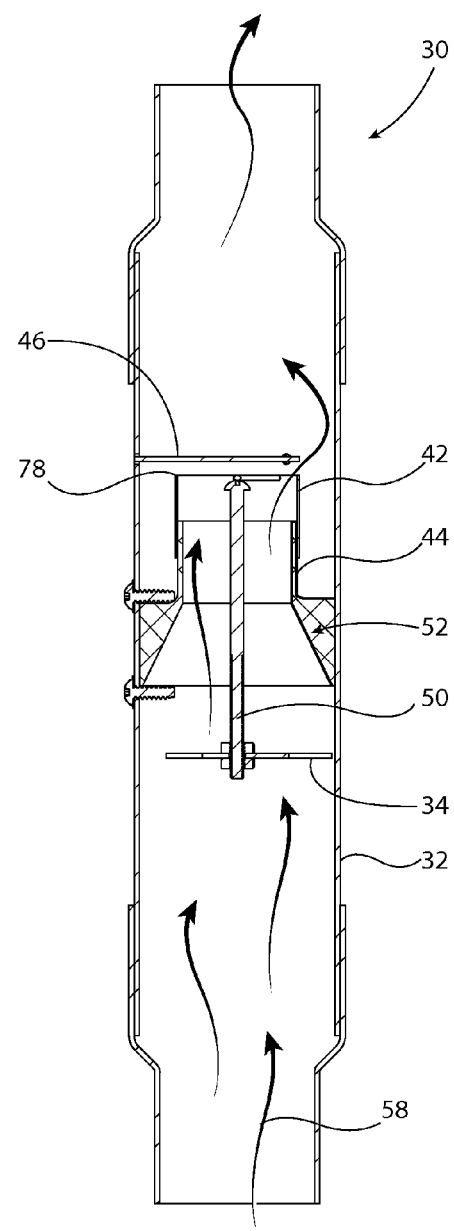
FIG. 6 is a sectional view in elevation of the air flow limiter illustrated in FIGS. 3 and 5, with the section taken at lines and arrows 3-3 in FIG. 4, with air flow through the air flow limiter being depicted in FIG. 6 by curved dark arrows.
Figure 7:
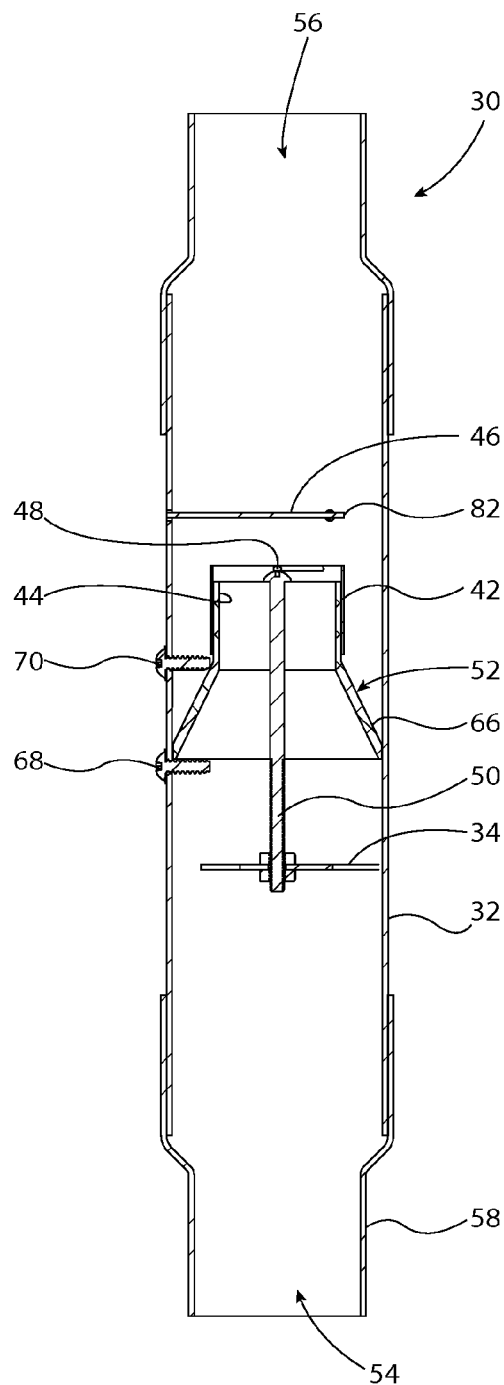
FIG. 7 is a sectional view in elevation, similar to FIG. 6, of the air flow limiter illustrated in FIGS. 3 through 6, but with the air flow limiter internal parts in position whereby there is no air entering the air flow limiter and hence there is no air flow upwardly through the air flow limiter, in contrast to the condition with such air flow shown in FIG. 6.

As shown in FIGS. 5, 6, and 7, a baffle 52 is positioned within vertically oriented outer tube 32, below plate 46. Baffle 52 has a lower conical portion 66 and an upper cylindrical portion 44, with cylindrical portion 44 defining a fixed internal tubular segment of air flow limiter 30. Baffle 52 is preferably retained in position by a pair of screws designated 68, 70 respectively. Baffle 52 preferably rests on screw 68. Screw 70 preferably fits against the fixed internal tubular segment 44 portion of baffle 52 to secure baffle 52 in position within vertically oriented external tube 32. Lateral force applied by screw 70 in a direction perpendicular to the axis of vertically oriented external tube 32, with screw 70 in contact with fixed internal tubular segment 44, serves to effectively retain baffle 52 against movement within vertically oriented external tube 32.

Figure 9:
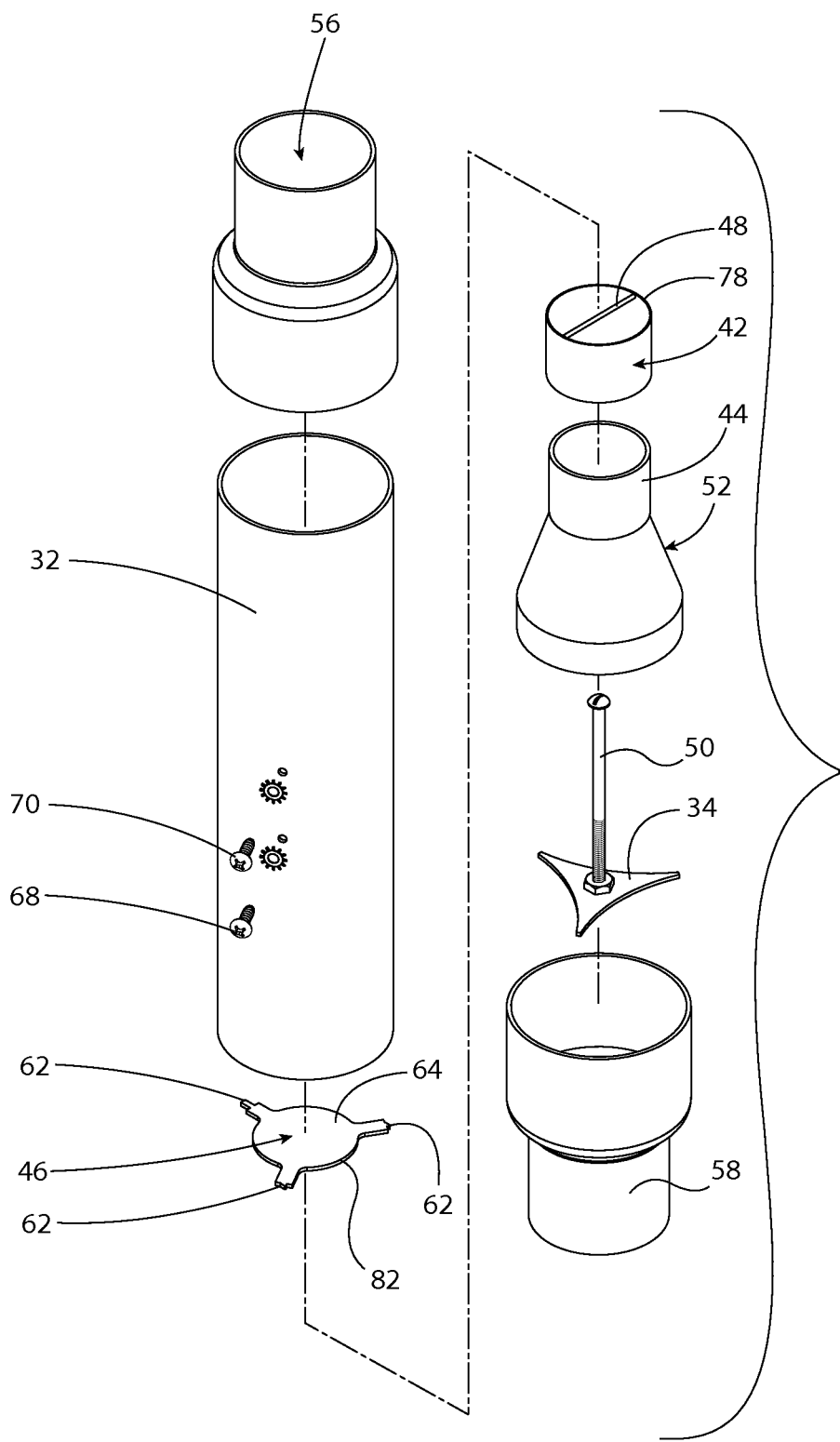
FIG. 9 is an exploded isometric view of the air flow limiter illustrated in FIGS. 3 through 8.
Figure 10:
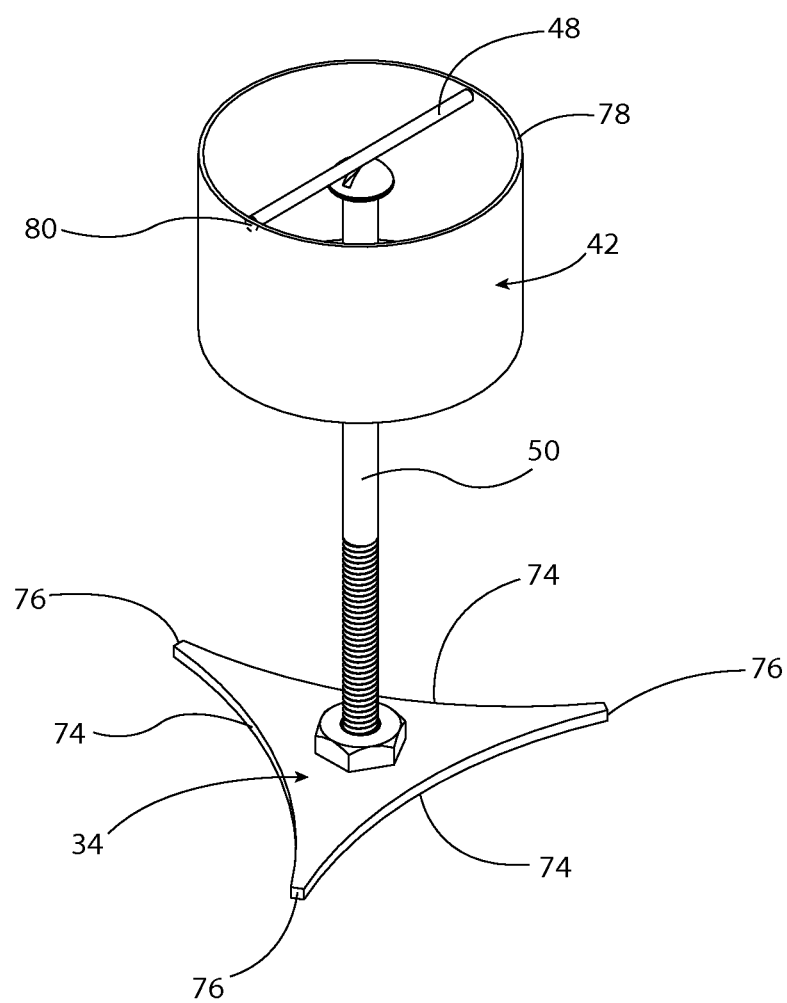
FIG. 10 is an isometric view of the movable portion of the air flow limiter illustrated in FIGS. 3 through 9.

The upper portion of baffle 52, defining fixed internal tubular segment 44, is adapted for sliding telescopic engagement with and movement therealong by movable tubular segment 42. Fixed to movable tubular segment 42 is a first strut 48 preferably extending transversally across the upper portion of movable tubular segment 42 and preferably secured on either end to movable tubular segment 42, as illustrated in FIG. 10. Preferably extending downwardly from first strut 48 is a second strut 50, preferably secured to first strut 48 and preferably also to a sail 34, as illustrated in FIG. 10 and in FIGS. 5, 6, 7, 8 and 9.

Movable sail 34 is preferably planar and positioned fixedly on second strut 50 to remain perpendicular with respect to the axis of vertically oriented outer tube 32. Movable sail 34 is preferably of generally triangular configuration, as illustrated in FIGS. 9 and 10, with the sides of the triangle curving slightly inwardly. The curved edges 72 of movable sail 34 converge and terminate to form small rectangular shaped extremities of sail 34, which are designated 76 in FIG. 9.

Movable sail 34 is positioned within generally vertically oriented outer tube 32 so that rectangular extremities 76 are closely adjacent to but do not contact the inner surface of vertically oriented outer tube 32, so long as sail 34 moves vertically up and down within vertically oriented external tube 32. The rectangular shape of extremities 76 with their outwardly facing planar surface assures minimal friction and consequent minimal resistance to movement of movable sail 34 in the event one of rectangular extremities 76 contacts the interior surface of vertically oriented tube 32, should sail 34 for some reason move laterally or otherwise and become skew to the vertical axis of tube 32.

Movable internal tubular segment 42 is telescopically movable, unitarily with sail 34, relative to and along fixed internal tubular segment 44. A lower limit of movement of movable tubular segment 42 is illustrated in FIG. 7, where the first strut portion 48 of movable tubular segment 42 (shown in FIG. 10) rests on the upper circular edge of fixed internal tubular segment 44. This is the condition when no air is flowing or drawn through the air flow limiter and gravity causes sail 34 together with movable internal tubular segment 42 to drop, with first strut 48 coming to rest on the upper circular edge of fixed tubular segment 44.

When air is flowing through air flow limiter 30, as illustrated generally in FIG. 6, the moving air pushes against movable sail 34, moving it upwardly. Movable internal tubular segment 42 moves upwardly unitarily with sail 34 due to the fixed connection of movable tubular segment 42 and movable sail 34 made via first and second struts 48, 50, as illustrated in FIGS. 5, 6, 7, 9, and 10.

Figure 15:
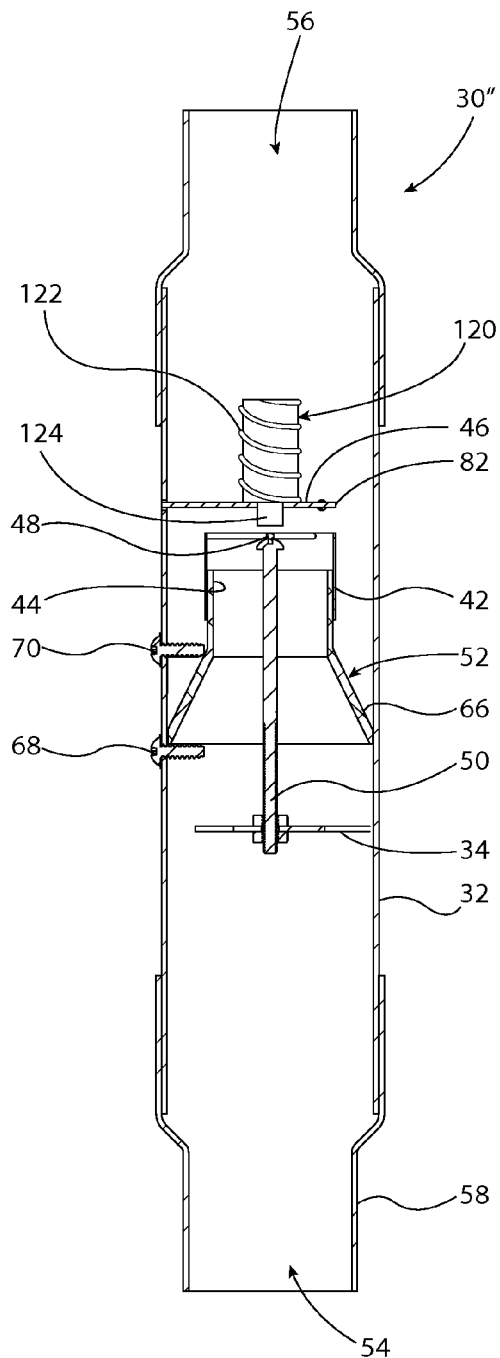
FIG. 15 is a sectional view in elevation, similar to FIG. 7, of an adjustable air flow limiter in accordance with the invention, with the air flow limiter internal parts in position whereby a moderate amount of air is entering the air flow limiter, the sail assembly has been lifted by air flow, and the air flow limiter internal valve has not contacted a "stop" defining an intermediate valve position and hence an intermediate maximum air flow rate through the air flow limiter.

Referring to FIGS. 15 and 16, if air flow upwardly through air flow limiter 30" reaches a first, preselected design limit, air flow contacting sail 34 pushes sail 34 upwardly so that the top of first strut 48 contacts circularly downwardly facing surface of piston 124 extending from solenoid 120. In this condition, with piston 124 being extended from solenoid 120 and held in position by action of solenoid 120, the first selected design limit air flow can pass through limiter 30" by passing upwardly past sail 34 through moveable tubular segment 42, around edge 82 of flow limiter plate 46 and then out of flow limiter 30". So long as piston 124 remains extended from solenoid 120, air can flow through limiter 30" with the air flow rate being up to the preselected first design limit.

If piston 124 is retracted into solenoid 120 such that the circular downwardly facing surface of piston 124 is at least flush with the lower surface of flow limiting horizontal plate 46, additional air, over and above the air flow defining the first design limit, can flow through limiter 30". Air can flow through limiter 30" against sail 34 and through moveable tubular segment 42 and around flow limiting plate 46 in an amount up to the second design limit. When flow reaches the second design limit, air flow is sufficient to push moveable sail 34 upwardly so that the top of first strut 48 contacts retracted piston 124 residing within solenoid 120 and the upwardly extending edges of moveable tubular segment 42 contact the lower facing surface of plate 46, thereby stopping air flow through limiter 30". In this condition, which is illustrated in FIG. 8, no air can pass between the upper annular edge 78 of movable tubular segment 42 and flow limiting horizontal plate 46, and air flow stops.

Figure 8:
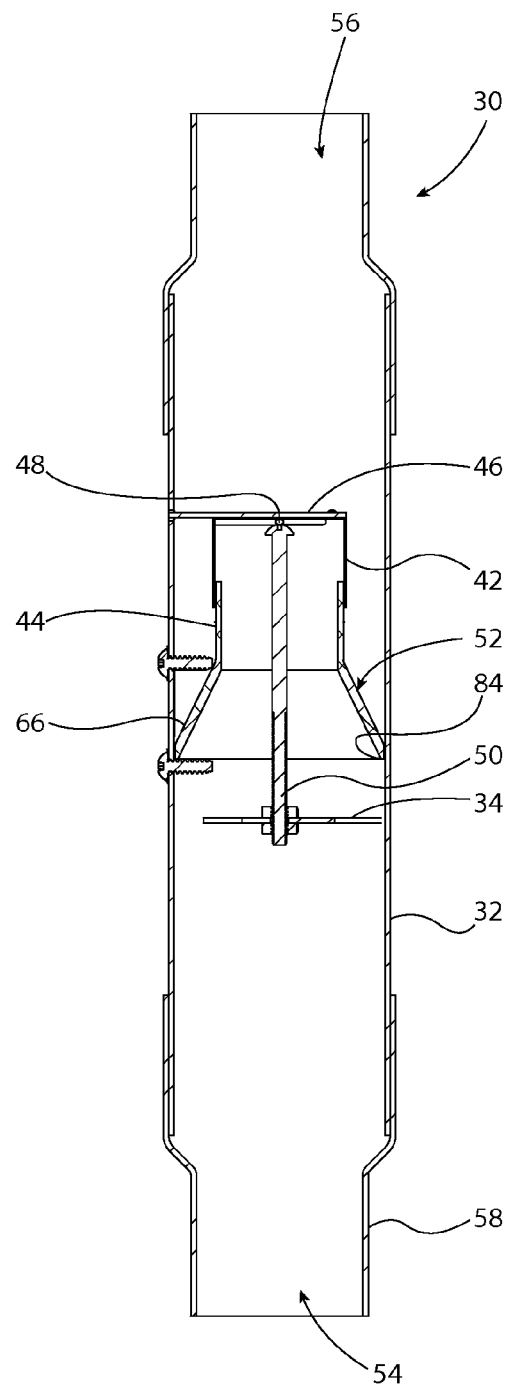
FIG. 8 is a sectional view in elevation, similar to FIGS. 6 and 7 of the air flow limiter illustrated in FIGS. 3 through 7, but with the air flow limiter internal parts in position where there is an excessive amount of air attempting to enter the air flow limited but there is no air flow upwardly through the air flow limiter due to the air flow limiter valve having moved to block air flow upwardly through the air flow limiter, in contrast to air flow upwardly through the air flow limiter as shown in FIG. 4.

Once air flow stops through vertically oriented outer tube 32, gravity pulling downwardly on sail 34, connected movable internal tubular segment 42, and first and second struts 48, 50, causes these parts, which may be connected together and fabricated as a single integral assembly as shown in FIG. 8, to move downwardly, thereby again permitting air flow upwardly through air flow limiter 30 etc. as depicted generally in FIG. 6. Consequently, air flow limiter 30 etc. is self-regulating in that when air flow exceeds the second design limit, the force of air moving or impinging on sail 34 pushes movable internal tubular segment 42 upwardly until upper annular edge 78 of movable tubular segment 42 contacts plate 46 and no air can then escape upwardly between the upper annular edge 78 of movable tubular segment 42 and plate 46. This stops air flow through flow limiter 30 etc. until downward movement of sail 34 unitarily with movable internal tubular segment 42 moves upper annular edge 78 of movable tubular segment 42 away from plate 46, again permitting air to flow through the upper extremity of movable tubular segment 42, with air passing between upper annular edge 78 of movable internal tubular segment 42 and flow limiting horizontal plate 46, and then escaping through upper outlet end 56 of air flow limiter 30".

Air flow limiter 30" is also self-regulating when solenoid 120 has been actuated by energizing coil 122 and piston 124 has emerged from solenoid 120 as a result. In this condition, air flow limiter 30" is again self-regulating in that air flow cannot exceed the first design limit so long as piston 124 is extended from solenoid 120. The force of air moving or impinging on sail 34 pushes moveable internal tubular segment 42 upwardly until the top of first strut 48, which has been illustrated as the head of a machine screw, contacts extended piston 124. Hence, the assembly of sail 34, first and second struts 48, 50 and moveable tubular segment 42 may move between the position of no air flow, illustrated in FIG. 7, and the position at which first strut 48 contacts extending piston 124, thereby permitting air flow up to the first design limit through flow limiter 30, due to the space between the upper edges of the cylindrical surface of moveable tubular segment 42 and flow limiting plate 46.

With the self-regulating characteristic of air flow limiter 30, the assembly consisting of movable internal tubular segment 42, first and second struts 48, 50 and sail 34 may oscillate somewhat about the position at which air flow drawn by suction is at the desired level, as the vacuum pump drawing air through flow limiter 30 varies in cubic feet per minute of air drawn.

Desirably, ends of first strut 48, which is depicted as being horizontally disposed in the drawings, are mounted in movable tubular segment 42 in movable fashion such that first strut 48 can move slightly, rotationally, relative to movable internal segment 42. This is to provide a small amount of "play" in the event movable sail 34 and second strut 50, which is vertically oriented and connected to movable sail 34, become skew with respect to the vertical axis of vertically oriented exterior tube 32. Should this occur, the movable characteristic of first strut 48, being slightly rotatable relative to movable internal tubular segment 42, effectively precludes movable internal tubular segment 42 from binding with respect to fixed internal tubular segment 44 and thereby being restricted from what would otherwise be freely telescoping movement of movable internal tubular segment 42 relative to fixed internal tubular segment 44.

Desirably first strut 48 is rotatable relative to movable internal tubular segment 42, to provide maximum freedom of vertical motion of movable internal tubular segment 42 in the event movable sail 34 becomes skew to the axis of vertically oriented exterior tube 32, with consequent frictional force restricting vertical movement of movable sail 34.

Baffle 52 preferably includes two portions, the upper portion preferably being defined by fixed internal tubular segment 44 and a lower portion preferably being defined by conical portion 66 of baffle 52. A lower edge of baffle 52 is circular and is designated 84 in the drawings. Circular edge 84 fits closely against the annular interior wall of vertically oriented exterior tube 32 so that all air passing upwardly through air flow limiter 30, namely through vertically oriented exterior tube 32, is constrained to flow through the interior of baffle 52. The tight fitting of the circular lower edge of baffle 52 against the interior wall of vertically oriented exterior tube 32 forces all air entering flow limiter 30 from the bottom to flow through the interior of baffle 52, flowing upwardly through lower conical portion 66 of baffle 52.

The air then flows further upwardly through the interior of fixed internal tubular segment 44. Thereafter, if movable internal tubular segment 42 is spaced away from flow limiting horizontal plate 46, air flows along the surface of movable internal tubular segment 42, passing the upper annular edge 78 of movable internal tubular segment 42; air then flows around the space between edge 82 of flow limiting horizontal plate 46 and the interior annular wall of vertically oriented exterior tube 32. The air then flows out of air flow limiter 30 via open outlet end 56 formed in end cap 60.

Figure 12:
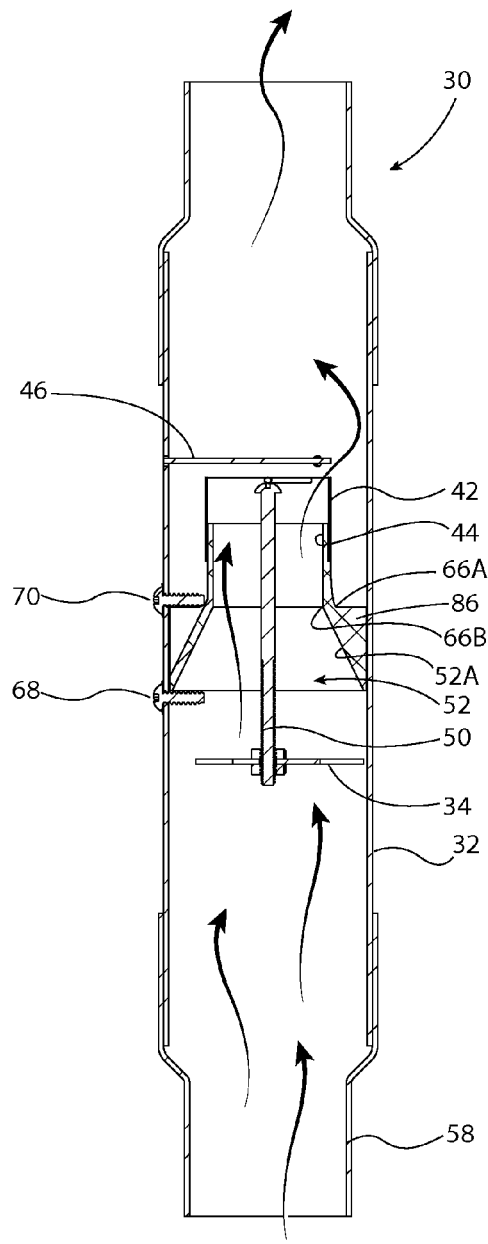
FIG. 12 is sectional view of the air flow limiter similar to FIGS. 6, 7, and 11, illustrating a second alternate construction of the baffle portion of the air flow limiter.

In an alternate embodiment of air flow limiter 30 etc., baffle 52 may be constructed from two pieces that fit closely together, with the two pieces being in facing contact in the area where they define fixed internal tubular segment 44, but diverging one from another in the area where they define conical portion 66 of baffle 52. As illustrated in FIG. 12, the two portions of baffle 52 are designated "66A" and "66B" where they diverge, with baffle portion 66A serving to channel air flow upwardly through vertically oriented exterior tube 32 into fixed internal tubular segment portion 44 of baffle 52. The space between the lower parts of baffle portions 66A and 66B is filled with a filler material 86 to provide additional assurance that all air entering vertically oriented exterior tube 32 from the bottom flows through fixed internal tubular segment 44 and on through movable internal tubular segment 42, and does not pass around the edge of baffle 52, namely between baffle 52 and the interior surface of vertically oriented exterior tube 32. Filler material 86 provides additional structural rigidity for flow limiter 30.

Figure 11:
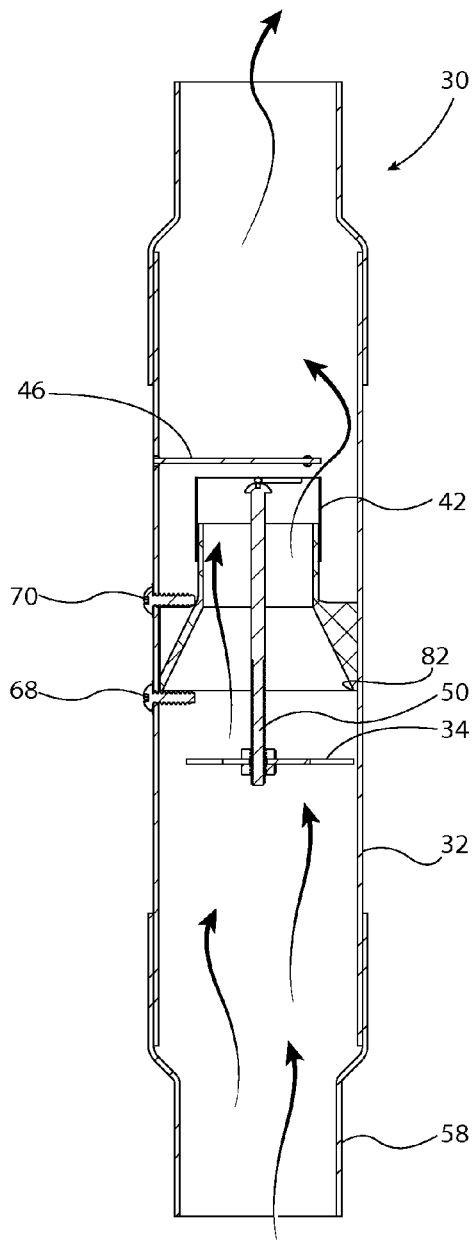
FIG. 11 is a sectional view of an air flow limiter similar to FIGS. 6, 7 and 8, illustrating an alternate construction of the baffle portion of the air flow limiter.

In another alternative environment of air flow limiter 30 etc., baffle 52 is one piece, preferably molded plastic, as illustrated in FIG. 11, where baffle 52 is designated 52B to distinguish it from the baffle construction illustrated in FIG. 12 and the baffle construction illustrated in the other drawing figures. In the baffle construction illustrated in FIG. 11, the one piece construction means that there is no need or space for any filler material.

The assembly illustrated in FIG. 10 comprising the moveable internal tubular segment 42, first strut 48, second strut 50 and moveable sail 34 may preferably be constructed as a single piece or several pieces as required. The assembly of moveable internal segment 42, first and second struts, 48, 50 and moveable sail 34 is referred to as a "sail assembly." It is not required that first and second struts 48, 50 be separate pieces; they may be fabricated as a single piece. Additionally, second strut 50, which has been illustrated as a machine screw in FIGS. 9 and 10, need not be a machine screw. Any suitable structure can be used for second strut 50 and it is particularly desirable to fabricate first and second struts 48 and 50 from a single piece of plastic or metal, by molding, by machining, by welding, or by otherwise fastening two pieces together. Similarly with the hex nut, which is unnumbered in FIG. 10 and illustrated there, any other suitable means for attachment of the second strut or a vertical portion of a strut assembly to moveable sail 34 may be used.

Figure 13:
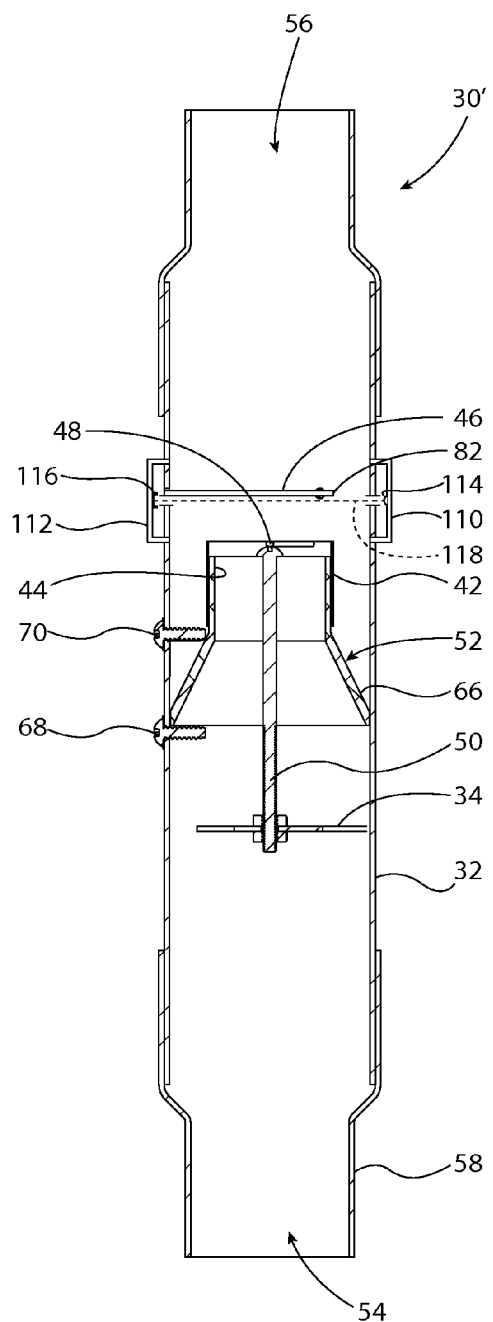
FIG. 13 is a sectional view of an air flow limiter of the type disclosed in co-pending U.S. patent application Ser. No. 14/593,010, with the sectional view being taken in elevation, similarly to FIG. 7, with an electromagnetic beam detecting position of the movable valve portion of the air flow limiter.

Referring to FIGS. 13 and 14, an air flow limiter in accordance with application Ser. No. 14/593,010, has been designated generally 30' and includes a vertically oriented exterior tube 32 and a moveable sail 34. These components are preferably the same as those described with respect to air flow limiter 30 above. Air flow limiter 30' further includes a pair of concentric telescoping tubular segments 40, a moveable internal tubular segment 42, a fixed internal tubular segment 44, a flow limiting horizontal plate 46, first and second struts 48, 50, a baffle 52, and an inlet end 54 and an outlet end 56, all preferably the same as the air flow limiter illustrated in the other drawing figures and as described above. Other parts that are shown in FIGS. 13 and 14, and that appear to be identical to corresponding parts shown in FIGS. 3 through 12, are identical and are not further delineated herein for the sake of some brevity.

Air flow limiter 30' illustrated in FIGS. 13 and 14 includes an emitter 114 and a detector 116, with emitter 114 emitting an electromagnetic beam 118 with the beam being detected by detector 116 when the beam impinges thereon. A housing 110 is provided for emitter 114. A housing 112 is provided for detector 116. Housings 110, 112, emitter 114, and detector 116 may be secured to the tubular portion of air flow limiter 30' by any suitable means. The detector detects when the electromagnetic beam has been intersected by the moveable portion of the air flow limiter, thereby providing an indication as to whether the air flow limiter has reached the second design value. It is within the scope of the invention to position emitter 114 and detector 116 differently so as to detect the position of moveable tubular segment 42 at various positions.

Referring to FIGS. 15 and 16, an air flow limiter in accordance with this invention has been designated generally 30" and includes a vertically oriented exterior tube 32 and a moveable sail 34, with these component being preferably the same as those described with respect to air flow limiters 30 and 30' above. Similarly to air flow limiter 30', air flow limiter 30" includes a pair of concentric telescopic tubular segments 40. Other parts that are shown in FIGS. 15 and 16, and that appear to be identical to corresponding parts shown in FIGS. 3 through 14, are identical and are not further delineated herein for the sake of some brevity.

Air flow limiter 30 etc. preferably contains no springs. Air flow limiter 30 etc. preferably contains no sensors to provide operating feedback to a control device for regulation of air flow limiter 30 etc.; no feedback control sensors are needed since because air flow limiter 30 etc. is self-regulating, and once in place, an air flow limiter is not subject to outside intervention or control, other than actuation of solenoid 120 to extend piston 124 therefrom to adjust the operation of air flow limiter 30". Air flow limiter 30 etc. preferably includes a tubular valve, closing against a flat surface, where the tubular valve is defined by movable internal tubular segment 42 closing against flow limiting horizontal plate 46. Movable internal tubular segment 42 is in the form of an open-ended cylinder and is connected to a plate in the form of movable sail 34 to move movable tubular segment 42 against flow limiting horizontal plate 46. Air flow limiter 30 etc. uses gravity alone to open the valve defined by the assembly of movable internal tubular segment 42, movable sail 34, and the connecting structure therebetween.

In the air flow limiter 30 etc. illustrated in FIGS. 3 through 16, the movable internal tubular segment 42 is preferably made with a very thin wall, preferably from metal tubing, where the wall is preferably less than 1/32 inch in thickness.

The air flow limiter of the invention functions equally well with a vacuum pump drawing air through air flow limiter 30 etc. from bottom to top by application of vacuum to outlet end 56 as depicted generally in FIGS. 1 and 2, or by air being supplied under positive pressure at inlet end 54 for passage upwardly through air flow limiter 30 etc.

In the claims appended hereto, the term "comprising" is to be understood as meaning "including, but not limited to" while the phrase "consisting of" should be understood to mean "having only and no more".

The following is claimed:

1. An air flow limiter, comprising:
   a. a vertically oriented tube;
   b. a pair of open-ended telescoping tubular segments within the tube, an outer tubular segment being fixed and the other open-ended telescoping tubular segment being slideably movable along the fixed segment in the axial direction;
   c. a plate extending partially across the interior of the vertically oriented tube, positioned for contacting the movable one of the telescoping tubular segments to limit travel of the moveable telescoping tubular segment, the plate covering an open upper end of the movable telescoping tubular segment upon contact therewith;
   d. an actuator connected to the plate for selectably limiting travel of said moveable tubular segment;
   e. a sail positioned in the vertically oriented tube below the telescoping segments;
   f. a strut connecting the sail and the moveable telescoping tubular segment;
   the movable telescoping tubular segment moving vertically within the tube unitarily with the sail responsive to upward air flow through the tube against the sail.

2. The adjustable air flow limiter of claim 1 wherein the moveable tubular segment is moveable between a first position at which the moveable segment rests on the fixed segment and a second position which the moveable segment contacts the actuator.

3. The adjustable air flow limiter of claim 1 wherein the surface of the plate contacted by the movable tubular segment is planar.

4. The adjustable air flow limiter of claim 2 wherein the portion of the moveable tubular segment contacting the plate surface is annular.

5. The adjustable air flow limiter of claim 1 wherein a surface of the plate contacted by the movable tubular segment is flat, the tubular segments are cylindrical, and a circular edge of the tubular segment contacting the plate surface is annular and normal to the axis of the tubular segment.

6. The adjustable air flow limiter of claim 1 wherein the actuator is a solenoid.

7. The adjustable air flow limiter of claim 1 wherein the moveable segment contacts a piston portion of the solenoid at one extreme of moveable segment travel.

8. An adjustable method for limiting air flow, comprising:
   a. providing a tube;
   b. providing within the tube a stationary baffle having a cylindrical outlet;
   c. positioning a movable sail assembly including a sail within the tube;
   d. providing a telescoping cylindrical member as a part of the assembly;
   e. permitting the cylindrical member of the sail assembly to move telescopingly within the baffle cylindrical outlet;
   f. positioning a moveable stop within the tube;
   g. moving the stop to a selected position corresponding to a desired maximum air flow through the tube; and
   h. permitting the sail assembly to move responsively to air flow through the tube between a position at which air flows around the sail assembly and through the tube and a position at which the sail assembly contacts the stop.

\* \* \* \* \*